United States Patent
Ruan

(10) Patent No.: US 10,412,661 B2
(45) Date of Patent: Sep. 10, 2019

(54) NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD EXECUTED BY COMMUNICATION DEVICE

(71) Applicant: BROTHER KOGYO KABUSHIKI KAISHA, Nagoya-shi, Aichi (JP)

(72) Inventor: Longlong Ruan, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/142,241

(22) Filed: Sep. 26, 2018

(65) Prior Publication Data

US 2019/0104464 A1    Apr. 4, 2019

(30) Foreign Application Priority Data

Sep. 29, 2017   (JP) .................. 2017-190505

(51) Int. Cl.
*G06F 3/12* (2006.01)
*H04W 48/02* (2009.01)
(Continued)

(52) U.S. Cl.
CPC .......... *H04W 48/02* (2013.01); *G06F 3/1236* (2013.01); *H04W 40/246* (2013.01);
(Continued)

(58) Field of Classification Search
CPC ..... H04W 48/02; H04W 48/18; H04W 48/20; H04W 40/246; H04W 48/16; H04W 84/12; G06F 3/1236
See application file for complete search history.

(56) References Cited

U.S. PATENT DOCUMENTS

2014/0179317 A1   6/2014   Tanaka
2015/0189023 A1   7/2015   Kubota et al.
(Continued)

FOREIGN PATENT DOCUMENTS

JP   2014127871 A   7/2014
JP   2015126501 A   7/2015
(Continued)

OTHER PUBLICATIONS

Wi-Fi Alliance, "Wi-Fi Peer-to-Peer (P2P) Technical Specification version 1.5", Aug. 4, 2014 (Aug. 4, 2014), pp. 1-183, Retrieved from the Internet <URL:https://www.wi-fi.org/downloads-registered/Wi-Fi_P2P_Technical_Specification_v1.5.pdf> [retrieved on Dec. 9, 2015].

*Primary Examiner* — Moustapha Diaby
(74) *Attorney, Agent, or Firm* — Scully, Scott, Murphy & Presser, PC

(57) ABSTRACT

A communication device may receive a predetermined signal from an external device in a situation where a specific wireless connection not via an access point is being established, determine whether a wireless communication via a first access point is executable with the external device, and supply a first disconnection instruction in a case where it is determined that the wireless communication via the first access point is executable with the external device. The communication device may execute the wireless communication with the external device using the first wireless connection in the case where it is determined that the wireless communication via the first access point is executable with the external device and execute a wireless communication with the external device using the specific wireless connection in the case where it is determined that the wireless communication via the first access point is not executable with the external device.

12 Claims, 12 Drawing Sheets

(51) Int. Cl.
*H04W 84/12* (2009.01)
*H04W 48/16* (2009.01)
*H04W 40/24* (2009.01)
*H04W 48/18* (2009.01)

(52) U.S. Cl.
CPC ........... *H04W 48/16* (2013.01); *H04W 48/18* (2013.01); *H04W 84/12* (2013.01)

(56) References Cited

U.S. PATENT DOCUMENTS

| | | |
|---|---|---|
| 2015/0223281 A1 | 8/2015 | Hamada |
| 2016/0253135 A1 | 9/2016 | Kubota et al. |
| 2016/0345254 A1* | 11/2016 | Iwami ................... H04W 92/18 |
| 2017/0006655 A1 | 1/2017 | Hamada |
| 2017/0195948 A1 | 7/2017 | Tanaka |
| 2018/0024792 A1 | 1/2018 | Kubota et al. |

FOREIGN PATENT DOCUMENTS

| | | |
|---|---|---|
| JP | 2015149625 A | 8/2015 |
| JP | 2016086384 A | 5/2016 |

* cited by examiner

FIG. 2
(Case A)
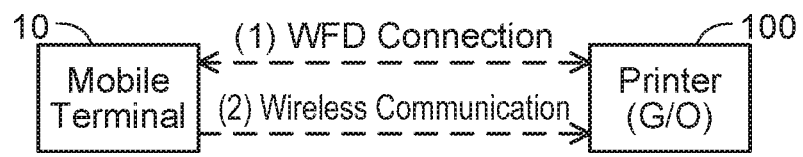
(Case B)
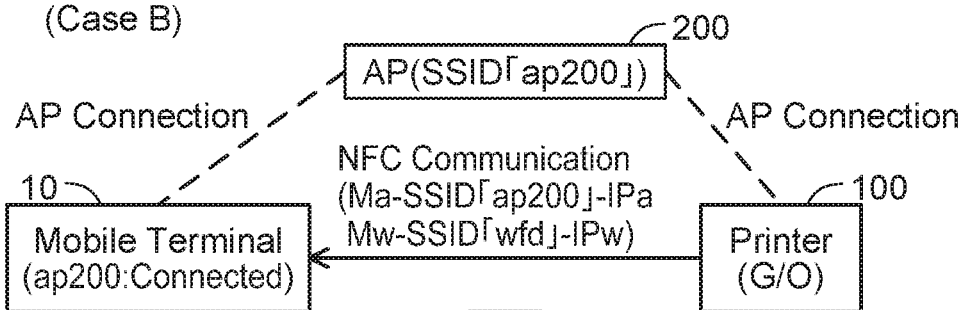
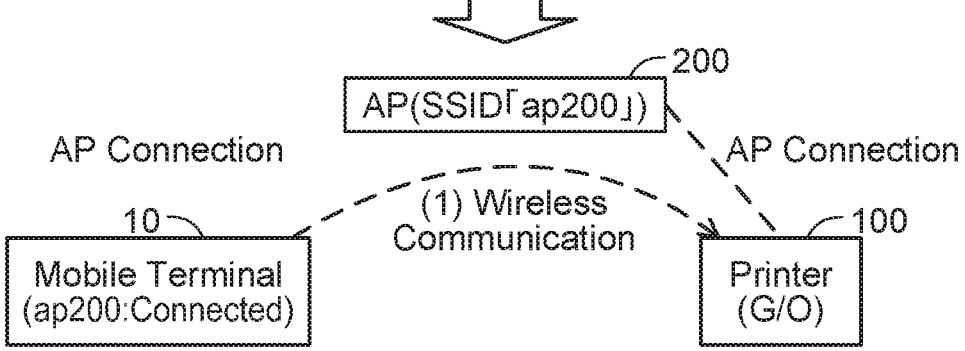

FIG. 3
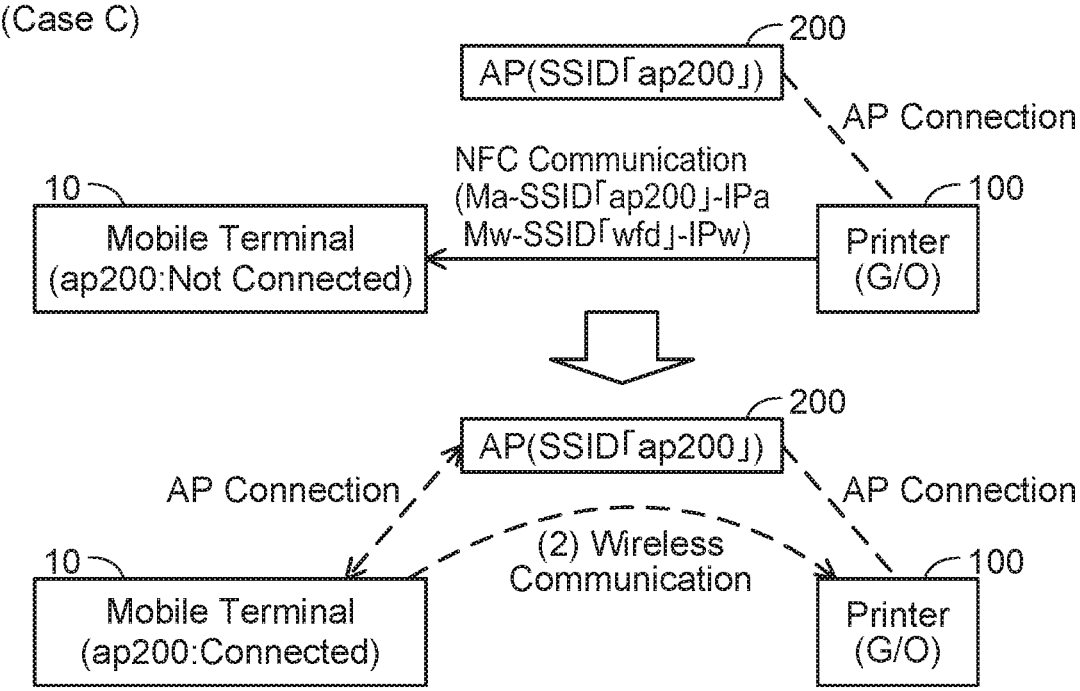
(Case C)
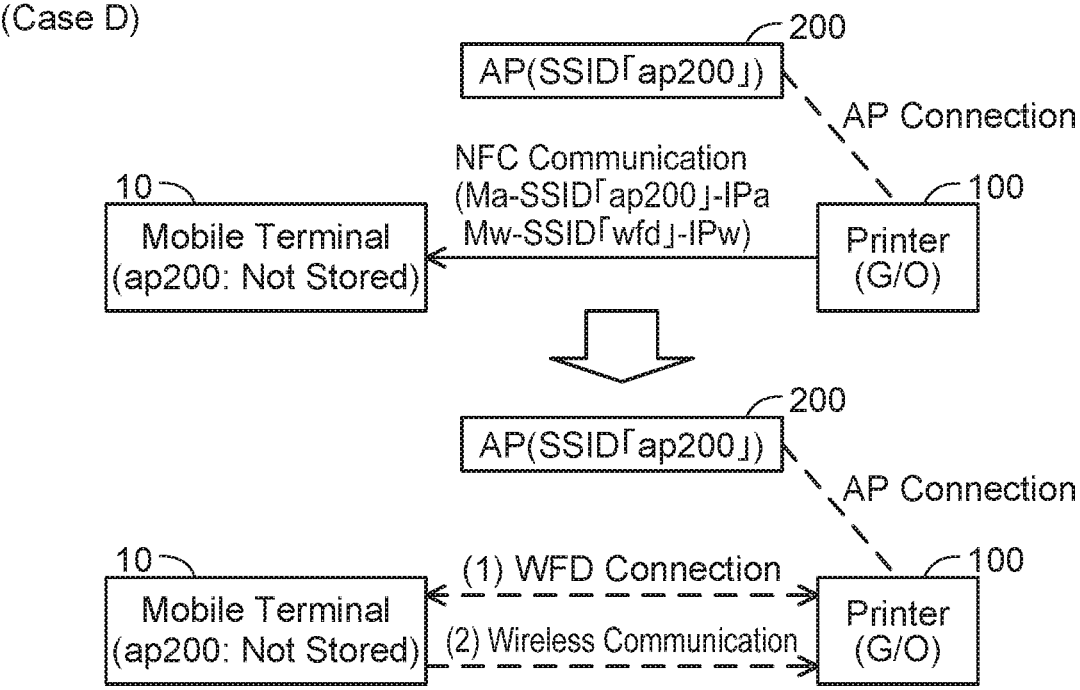
(Case D)

(Case J)

NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD EXECUTED BY COMMUNICATION DEVICE

CROSS-REFERENCE TO RELATED APPLICATION

This application claims priority to Japanese Patent Application No. 2017-190505, filed on Sep. 29, 2017, the entire contents of which are hereby incorporated by reference into the present application.

TECHNICAL FIELD

A disclosure herein discloses a technique related to a communication device capable of establishing both of a wireless connection with an access point and a wireless connection with an external device without involving an access point (which is equivalent to not via the access point).

BACKGROUND ART

A communication system including an MFP (abbreviation of Multi-Function Peripheral), a mobile terminal, and an access point (termed "AP" hereinafter) is known. In a case where an NFC (abbreviation of Near Field Communication) communication session is established with the MFP, the mobile terminal sends a request command to the MFP and receives a response (normal use information, WFD (abbreviation of Wi-Fi Direct (registered trademark)) use information, wireless setting information used in a WFD network, or NG information) to the request command. In a case where the mobile terminal receives normal use information as the response under a situation where a connection is established with the AP forming a network that the MFP is participating in and another connection is established with the MFP without involving the AP, the mobile terminal executes a wireless communication with the MFP by using the network formed by the AP, and maintains the connection with the AP and the connection with the MFP without involving the AP. Further, in a case where the mobile terminal receives WFD use information or wireless setting information as the response under a situation where the connection is not established with the AP forming the network that the MFP is participating in, the mobile terminal executes a wireless communication with the MFP by using a WFD network and maintains the connection with the MFP without involving the AP.

SUMMARY

In the communication system above, the mobile terminal maintains the connection with the AP and the connection with the MFP without involving the AP even after having executed the wireless communication with the MFP by using the network formed by the AP. Under the situation where both of the connection with the AP and the connection with the MFP without involving the AP are established, processing load of the mobile terminal is high.

The disclosure herein discloses a technique capable of reducing processing load of a communication device.

The disclosure herein discloses a non-transitory computer-readable recording medium storing computer-readable instructions for a communication device, wherein the computer-readable instructions, when executed by a processor of the communication device, may cause the communication device to: receive a predetermined signal from an external device in a situation where a specific wireless connection not via an access point is being established between a first wireless interface of the communication device and the external device, the predetermined signal including establishment information indicating that a wireless connection between the external device and a first access point is being established; determine whether a wireless communication via the first access point is executable with the external device in a case where the predetermined signal including the establishment information is received from the external device; supply a first disconnection instruction that instructs disconnection of the specific wireless connection to the first wireless interface in a case where it is determined that the wireless communication via the first access point is executable with the external device due to a first wireless connection being currently established between the first wireless interface and the first access point, wherein the first disconnection instruction is not supplied to the first wireless interface in a case where it is determined that the wireless communication via the first access point is not executable with the external device; execute the wireless communication via the first access point with the external device using the first wireless connection in the case where it is determined that the wireless communication via the first access point is executable with the external device due to the first wireless connection being currently established; and execute a wireless communication not via the first access point with the external device using the specific wireless connection in the case where it is determined that the wireless communication via the first access point is not executable with the external device.

The above-mentioned communication device itself is also novel and useful. Further, a communication system comprising the above-mentioned communication device and external device is also novel and useful.

BRIEF DESCRIPTION OF DRAWINGS

FIG. 2 shows a sequence diagram of a case A in which a mobile terminal 10 establishes a wireless connection with a printer 100 without involving an AP 200 (termed "WFD connection" hereinafter), and a sequence diagram of a case B in which the mobile terminal 10 maintains a wireless connection with the AP 200 (termed "AP connection" hereinafter).

FIG. 3 shows a sequence diagram of a case C in which the mobile terminal 10 establishes the AP connection, and a sequence diagram of a case D in which the mobile terminal 10 establishes the WFD connection.

EMBODIMENTS

Figure 1:
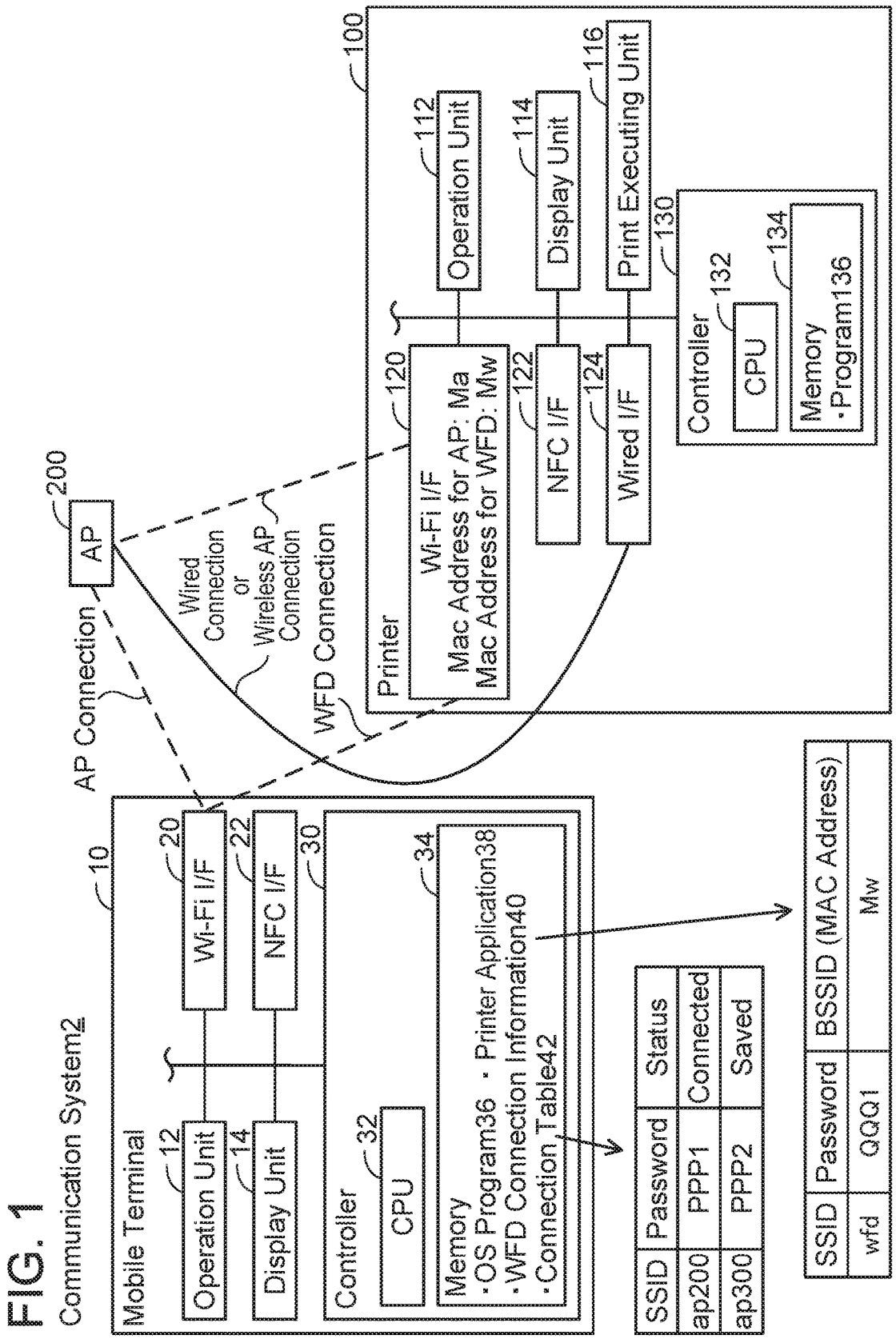
FIG. 1 shows a configuration of a communication system 2.

Configuration of Communication System 2: FIG. 1

As shown in FIG. 1, a communication system 2 comprises a mobile terminal 10, a printer 100, and an AP (abbreviation of Access Point) 200. The mobile terminal 10 and the printer 100 are capable of mutually executing a Wi-Fi communication which is a wireless communication according to a Wi-Fi scheme as well as capable of mutually executing an NFC communication which is a wireless communication according to an NFC (abbreviation of Near Field Communication) scheme.

Configuration of Mobile Terminal 10

The mobile terminal 10 is a portable terminal device such as a mobile phone, a smartphone, a PDA, a tablet PC, a portable music player, a portable video player, and the like. The mobile terminal 10 comprises an operation unit 12, a display unit 14, a Wi-Fi interface 20 (interface will be termed "I/F" hereinafter), an NFC I/F 22, and a controller 30.

The operation unit 12 includes a plurality of keys. A user can input various instructions to the mobile terminal 10 by operating the operation unit 12. The display unit 14 is a display for displaying various types of information and also functions as a so-called touch panel (i.e., an operation unit). Hereinafter, the operation unit 12 and the display unit 14 may be collectively termed "terminal operation unit".

The Wi-Fi I/F 20 is an I/F for executing a Wi-Fi communication according to the Wi-Fi scheme. The Wi-Fi scheme is a wireless communication scheme based on, for example, IEEE (abbreviation of The Institute of Electrical and Electronics Engineers Inc.) standard 802.11 and standards conforming thereto (e.g., 802.11a, 11b, 11g, 11n, etc.). The Wi-Fi I/F 20 especially supports a WFD (abbreviation of Wi-Fi Direct (registered trademark)) scheme formulated by Wi-Fi Alliance. The WFD scheme is a wireless communication scheme described in the standard document "Wi-Fi Peer-to-Peer (P2P) Technical Specification Version 1.5" created by the Wi-Fi Alliance.

The mobile terminal 10 can establish a wireless connection via the Wi-Fi I/F 20 with an external device (e.g., the printer 100) that is operating as G/O (abbreviation of Group Owner) of the WFD scheme so as to participate, as a child station, in a WFD network (termed "WFDNW" hereinafter) formed by the external device. That is, the mobile terminal 10 can establish a wireless connection via the Wi-Fi I/F 20 with the external device without involving an AP (which is equivalent to establishing the wireless connection not via the AP). In the present embodiment, a wireless connection without involving an AP will be termed "WFD connection".

The mobile terminal 10 can also establish a wireless connection with the AP 200 via the Wi-Fi I/F 20 so as to participate, as a child station, in a wireless network formed by the AP 200 (termed "APNW" hereinafter). Further, the mobile terminal 10 can also establish a wireless connection with an AP different from the AP 200. In the present embodiment, a wireless connection with an AP will be termed "AP connection".

When the WFD connection is already established, the mobile terminal 10 can further establish an AP connection. In addition, when an AP connection is already established, the mobile terminal 10 can further establish the WFD connection. However, the mobile terminal 10 cannot establish two or more AP connections simultaneously or establish two or more WFD connections simultaneously.

The NFC I/F 22 is an I/F for executing an NFC communication according to the NFC scheme. The NFC scheme is a wireless communication scheme based on international standards, such as ISO/IEC14443, 15693, and 18092. As types of I/Fs for executing an NFC communication, an I/F called NFC forum device and an I/F called NFC forum tag are known. The NFC I/F 22 is an NFC forum device and can selectively operate in any of a P2P (abbreviation of Peer To Peer) mode, a R/W (abbreviation of Reader/Writer) mode, and a CE (abbreviation of Card Emulation) mode.

The controller 30 includes a CPU 32 and a memory 34. The CPU 32 executes various processes according to an OS (abbreviation of Operating System) program 36 which is stored in the memory 34. The memory 34 further stores a printer application 38, WFD connection information 40, and a connection table 42.

The printer application 38 is an application provided by a vender of the printer 100 and is installed to the mobile terminal 10, for example, from a server on the Internet. The printer application 38 is an application for executing a communication of target data (e.g., print data, etc.) with the printer 100 by using the WFD connection or the AP connection, in response to an NFC link being established between the mobile terminal 10 and the printer 100. The printer application 38 will simply termed "app 38" hereinafter.

The WFD connection information 40 is information stored in the memory 34 while the mobile terminal 10 establishes the WFD connection with the G/O and participates in the WFDNW. The WFD connection information 40 includes an SSID (abbreviation of Service Set Identifier), a password, and a BSSID (abbreviation of Basic Service Set Identifier). Each of the SSID and the BSSID is identification information for identifying the WFDNW. In particular, the BSSID is a MAC address assigned to a Wi-Fi I/F of the G/O. The password is used for authentication in the WFDNW. The WFD connection information 40 is not stored when the mobile terminal 10 does not have a WFD connection established.

The connection table 42 is a table for storing one or more pieces of AP connection information. In each piece of the AP connection information, an SSID for identifying an APNW, a password used for authentication in that APNW, and a current status related to that APNW are associated with each other. The AP connection information is registered in the connection table 42 when the mobile terminal 10 establishes an AP connection with a certain AP for the first time. The status indicates any of plural statuses including "Connected"

which indicates that an AP connection is being established and "Not Connected" which indicates that an AP connection was established in the past but is not being established currently.

Configuration of Printer 100

The printer 100 is a peripheral device capable of executing a print function. The printer 100 comprises an operation unit 112, a display unit 114, a print executing unit 116, a Wi-Fi I/F 120, an NFC I/F 122, a wired I/F 124, and a controller 130.

The operation unit 112 includes a plurality of keys. The user can input various instructions to the printer 100 by operating the operation unit 112. The display unit 114 is a display capable of displaying various types of information by using a character string and/or an icon image. The display unit 114 also functions as a so-called touch panel (i.e., an operation unit). The print executing unit 116 is a print mechanism of an inkjet scheme, a laser scheme, or the like.

The Wi-Fi I/F 120 is an I/F for executing a Wi-Fi communication according to the Wi-Fi scheme and supports the WFD scheme. The Wi-Fi I/F 120 is assigned with both of a MAC address "Ma" used for an AP connection and a MAC address "Mw" used for the WFD connection. Due to this, when the WFD connection is already established, the printer 100 can further establish an AP connection. In addition, when an AP connection is already established, the printer 100 can further establish the WFD connection.

The NFC I/F 122 is the same as the NFC I/F 22 of the mobile terminal 10. The wired I/F 124 is an I/F for executing a wired communication. The printer 100 can establish a wired connection with the AP 200 via the wired I/F 124.

The controller 130 includes a CPU 132 and a memory 134. The CPU 132 executes various processes according to a program 136 which is stored in the memory 134. The memory 134 is constituted of a volatile memory, a non-volatile memory, and the like.

Specific Cases: FIGS. 2 to 9

Referring to FIGS. 2 to 9, specific cases A to K which are implemented by the communication system 2 of the present embodiment will be described. In an initial state of each of the cases, the printer 100 is operating in a G/O state according to the WFD scheme and forming a WFDNW. Wireless setting information used in that WFDNW includes an SSID "wfd", a password "QQQ1", and the MAC address "Mw".

Case A: FIG. 2

In the initial state of the case A shown in FIG. 2, a WFD connection is not established between the mobile terminal 10 and the printer 100, and an AP connection is not established between the mobile terminal 10 and the AP 200.

When the user brings the mobile terminal 10 close to the printer 100, an NFC link is established between the NFC I/F 22 of the mobile terminal 10 and the NFC I/F 122 of the printer 100. In this case, an NFC communication is executed between the mobile terminal 10 and the printer 100. Specifically, the printer 100 sends an NDEF (abbreviation of NFC Data Exchange Format) signal to the mobile terminal 10. The NDEF signal includes AP information, WFD information, and wired information.

The AP information is information in which the MAC address "Ma" used for AP connection and information indicating a utilization status of that MAC address "Ma" (termed "Ma information" hereinafter) are associated with each other. When the printer 100 establishes an AP connection by using the AP MAC address "Ma" and participates in an APNW, the Ma information includes an SSID of the APNW and an IP address of the printer 100 in the APNW. On the other hand, when the printer 100 does not establish an AP connection, the Ma information is empty information. In the case A, a state where the Ma information is empty information is expressed by a character string "Not Used".

The WFD information is information in which the MAC address "Mw" used for WFD connection and information indicating a utilization status of that MAC address "Mw" (termed "Mw information" hereinafter) are associated with each other. In the present embodiment, in all of the cases, it is assumed that the printer 100 is forming a WFDNW by using the WFD MAC address "Mw". The Mw information includes the SSID "wfd" of the WFDNW and an IP address "IPw" of the printer 100 in the WFDNW.

The wired information is information in which a MAC address of the wired I/F 124 and information indicating a utilization status of that MAC address are associated with each other. When the wired I/F 124 has established a wired connection with an AP, the wired information includes an SSID of the APNW and an IP address of the printer 100 in that APNW. However, in each of the cases described below, it is not assumed that the wired I/F 124 establishes a wired connection with an AP. Therefore, the wired information is not shown in FIG. 2 and in the subsequent drawings.

The mobile terminal 10 determines that the printer 100 does not have an AP connection established because the Ma information in the NDEF signal indicates the empty information "Not Used", and also determines that the printer 100 is forming the WFDNW because the Mw information in the NDEF signal includes the SSID "wfd" and the like. In the present case, the mobile terminal 10 determines that a WFD connection with the printer 100 is not established because the WFD connection information 40 that includes an SSID identical to the SSID "wfd" is not stored. In this case, the mobile terminal 10 executes a WFD connection process (communications for Probe signal, WSC Exchange, Authentication, Association, 4-way Handshake and the like) to establish a WFD connection with the printer 100. Thereby, a WFD connection is established between the mobile terminal 10 and the printer 100 (see (1)). Then, the mobile terminal 10 executes a wireless communication with the printer 100 by using the WFD connection (see (2)). This wireless communication includes sending of print data from the mobile terminal 10 to the printer 100, sending of capability function of the printer 100 from the printer 100 to the mobile terminal 10, and the like. The capability information is information indicating that the printer 100 can execute the print function.

As illustrated in the case A, the mobile terminal 10 establishes the WFD connection with the printer 100, and thus it can suitably execute the wireless communication with the printer 100 by using the WFD connection.

Case B: FIG. 2

In the initial state of the case B, a WFD connection is not established between the mobile terminal 10 and the printer 100, and both of the mobile terminal 10 and the printer 100 have established AP connections with the same AP 200. In this state, the mobile terminal 10 has AP connection information stored in the connection table 42. In the AP connection information, an SSID "ap200", a password "PPP1", and a status "Connected" are associated with each other (see FIG. 1).

When the user brings the mobile terminal 10 close to the printer 100, the printer 100 sends an NDEF signal to the mobile terminal 10. In the present case, the AP connection is already established between the printer 100 and the AP 200. Due to this, Ma information in the NDEF signal includes the SSID "ap200" for the APNW formed by the AP 200 and an IP address "IPa" of the printer 100 in the APNW. Mw information in the NDEF signal is the same as the Mw information of the case A.

The mobile terminal 10 determines that the printer 100 has established the AP connection because the Ma information in the NDEF signal includes the SSID "ap200" and the like. In this case, the mobile terminal 10 sends a PING signal that includes the IP address "IPa" included in the Ma information as its destination. Since both of the mobile terminal 10 and the printer 100 are connected to the same AP 200, the PING signal reaches the printer 100 via the AP 200. As a result, the mobile terminal 10 receives a PING response to the PING signal from the printer 100 via the AP 200, and determines that both of the mobile terminal 10 and the printer 100 establish the AP connections with the same AP 200. In this case, unlike the case A, the mobile terminal 10 does not establish a WFD connection with the printer 100. Then, the mobile terminal 10 executes a wireless communication with the printer 100 via the AP 200 (see (1)).

As illustrated in the case B, in the situation where both of the mobile terminal 10 and the printer 100 have the AP connections established with the same AP 200 and the mobile terminal 10 does not establish a WFD connection with the printer 100, the mobile terminal 10 executes the wireless communication with the printer 100 via the AP 200 without establishing a WFD connection with the printer 100. Since the mobile terminal 10 establishes just one of the AP connection with the AP 200 and a WFD connection with the printer 100, processing load of the mobile terminal 10 can be reduced. In a variant, the mobile terminal 10 may determine that both of the mobile terminal 10 and the printer 100 have the AP connections established with the same AP 200 by determining that the connection table 42 includes an SSID identical to the SSID "ap200" included in the Ma information and by determining that the SSID "ap200" is associated with the status "Connected" in the connection table 42, instead of by sending the PING signal including the IP address "IPa" as its destination.

Case C: FIG. 3

In the initial state of the case C in FIG. 3, a WFD connection is not established between the mobile terminal 10 and the printer 100, and an AP connection is already established between the printer 100 and the AP 200. Further, although an AP connection is not currently established between the mobile terminal 10 and the AP 200, there is a history that an AP connection was established therebetween in the past. In this state, the mobile terminal 10 has AP information stored in the connection table 42. In the AP information, the SSID "ap200", the password "PPP1", and a status "Not Connected" are associated with each other.

When the user brings the mobile terminal 10 close to the printer 100, the printer 100 sends an NDEF signal to the mobile terminal 10. Ma information and Mw information in this NDEF signal are the same as those of the case B in FIG. 2.

The mobile terminal 10 determines that the printer 100 has established the AP connection because the Ma information in the NDEF signal includes the SSID "ap200" and the like, and sends a PING signal including the IP address "IPa" as its destination. In this case, since the mobile terminal 10 is not connected to the AP 200, the PING signal does not reach the printer 100 via the AP 200. As a result, the mobile terminal 10 does not receive a PING response to the PING signal, and determines that just one of the mobile terminal 10 and the printer 100 has established the AP connection with the same AP 200. Further, the mobile terminal 10 determines that the connection table 42 includes an SSID identical to the SSID "ap200" included in the Ma information, and determines that the status "Not Connected" is associated with the SSID "ap200" in the connection table 42. Due to this, the mobile terminal 10 determines that it can establish an AP connection with the AP 200 with which the printer 100 is already establishing the AP connection. In this case, the mobile terminal 10 establishes an AP connection with the AP 200 by using the SSID "ap200" and the password "PPP1" in the connection table 42 (see (1)). Then, the mobile terminal 10 executes a wireless communication with the printer 100 via the AP 200 (see (2)).

As illustrated in the case C, in the situation where the mobile terminal 10 can establish the AP connection with the AP 200 and the mobile terminal 10 has not established a WFD connection with the printer 100, the mobile terminal 10 establishes the AP connection with the AP 200 to execute the wireless communication with the printer 100, without establishing a WFD connection with the printer 100. Since the mobile terminal 10 establishes just one of the AP connection with the AP 200 and a WFD connection with the printer 100, the processing load of the mobile terminal 10 can be reduced.

Case D: FIG. 3

The initial state of the case D is the same as that of the case C, except that there is no history that an AP connection was established between the mobile terminal 10 and the AP 200. In this state, the mobile terminal 10 does not store AP connection information including the SSID "ap200" in the connection table 42.

When the user brings the mobile terminal 10 close to the printer 100, the printer 100 sends an NDEF signal to the mobile terminal 10. Ma information and Mw information in the NDEF signal are the same as those of the case B in FIG. 2 and the case C in FIG. 3.

The mobile terminal 10 determines that the printer 100 has established the AP connection because the Ma information in the NDEF signal includes the SSID "ap200" and the like, and sends a PING signal including the IP address "IPa" as its destination. However, the mobile terminal 10 does not receive a PING response. Further, since the connection table 42 does not include an SSID identical to the SSID "ap200" included in the Ma information, the mobile terminal 10 determines that it cannot establish an AP connection with the AP 200 with which the printer 100 is establishing the AP connection. In addition, since the Mw information in the NDEF signal includes the SSID "wfd" and the like, the mobile terminal 10 determines that the printer 100 has formed the WFDNW. In the present case, the mobile terminal 10 determines that a WFD connection is not established with the printer 100 because the WFD connection information 40 that includes an SSID identical to the SSID "wfd" is not stored. In this case, the mobile terminal 10 executes the WFD connection process to establish a WFD connection with the printer 100. Due to this, a WFD connection is established between the mobile terminal 10 and the printer 100 (see (1)). Then, the mobile terminal 10 executes a wireless communication with the printer 100 by using the WFD connection (see (2)).

As illustrated in the case D, in the situation where the mobile terminal 10 cannot establish an AP connection and the mobile terminal 10 has not established a WFD connection with the printer 100, the mobile terminal 10 establishes the WFD connection with the printer 100. Due to this, the mobile terminal 10 can suitably execute the wireless communication with the printer 100 by using the WFD connection.

Figure 4:
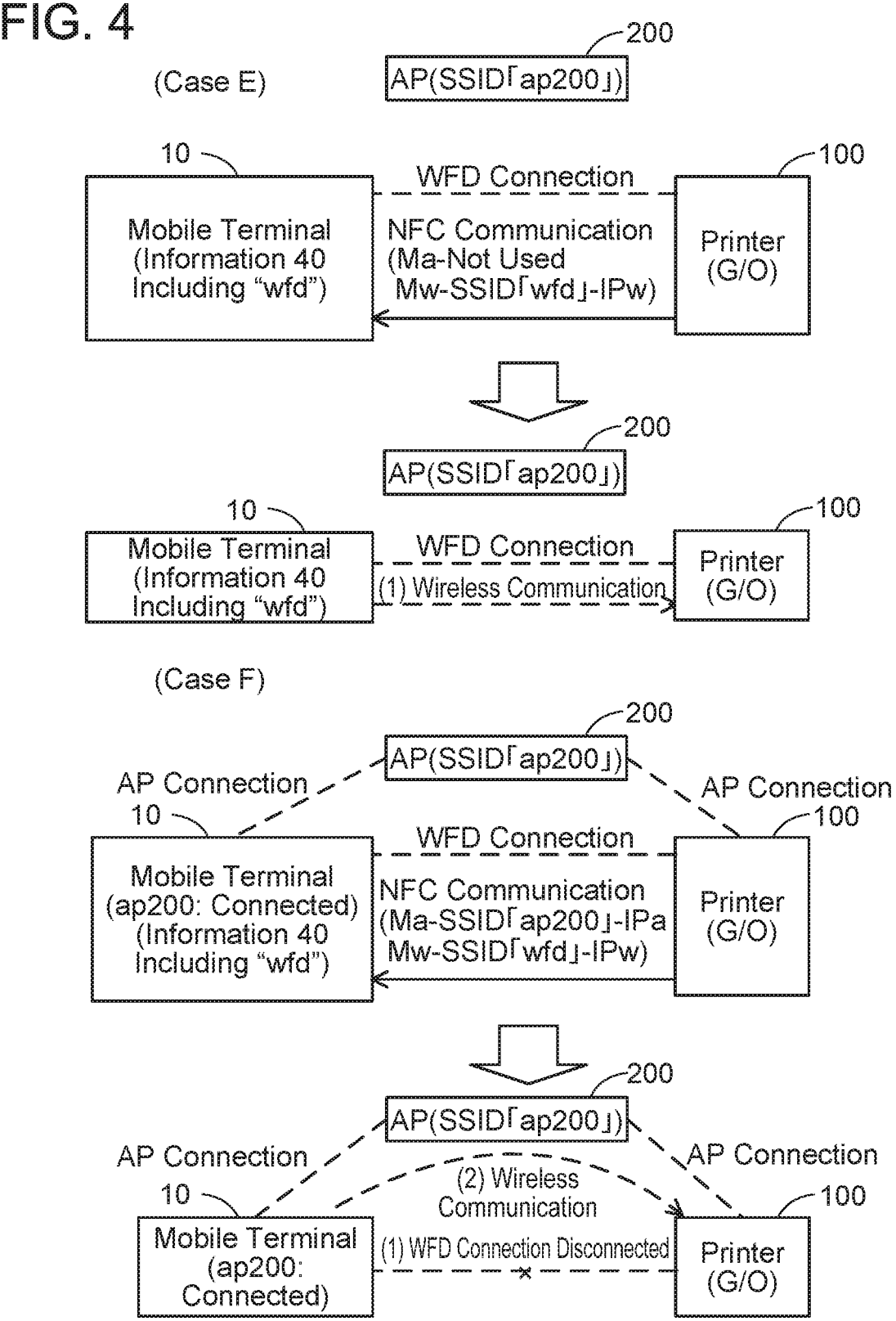
FIG. 4 shows a sequence diagram of a case E in which the mobile terminal 10 maintains the WFD connection, and a sequence diagram of a case F in which the mobile terminal 10 disconnects the WFD connection.

Case E: FIG. 4

The case E in FIG. 4 is a continuation of the case A in FIG. 2. That is, the WFD connection is established between the printer 100 and the mobile terminal 10. In this state, the mobile terminal 10 has the WFD connection information 40 including the SSID "wfd", the password "QQQ1", and a BSSID "Mw" (see FIG. 1) stored therein.

When the user brings the mobile terminal 10 close to the printer 100, the printer 100 sends an NDEF signal to the mobile terminal 10. Ma information and Mw information in the NDEF signal are the same as those of the case A in FIG. 2. It should be noted that in a situation where a WFD connection has been already established between the printer 100 and the mobile terminal 10 as in the present case, the user can cause the mobile terminal 10 to send print data to the printer 100 by using the WFD connection, even without bringing the mobile terminal 10 close to the printer 100 again. However, if the user believes that the WFD connection established in the case A of FIG. 2 had been disconnected, he/she may bring the mobile terminal 10 close to the printer 100 again as in the case E of FIG. 4.

The mobile terminal 10 determines that the printer 100 has not established an AP connection because the Ma information in the NDEF signal indicates the empty information "Not Used". The mobile terminal 10 further determines that the WFD connection is established with the printer 100 because the WFD connection information 40 that includes an SSID and a BSSID identical to the SSID "wfd" and the BSSID "Mw" included in the Mw information in the NDEF signal is stored. In this case, the mobile terminal 10 maintains the WFD connection with the printer 100. Then, the mobile terminal 10 executes a wireless communication with the printer 100 by using the WFD connection (see (1)).

As illustrated in the case E, in the situation where the WFD connection is established with the printer 100, the mobile terminal 10 maintains the WFD connection. Thus, the mobile terminal 10 can suitably execute the wireless communication with the printer 100 by using the WFD connection.

Case F: FIG. 4

In the initial state of the case F, a WFD connection is already established between the mobile terminal 10 and the printer 100, and both of the mobile terminal 10 and the printer 100 have established AP connections with the same AP 200. For example, if the mobile terminal 10 establishes an AP connection with the AP 200 and the printer 100 also establishes an AP connection with the AP 200 after the WFD connection has been established between the mobile terminal 10 and the printer 100 in the case A of FIG. 2, the initial state of the case F comes to thereby take place. In this state, the mobile terminal 10 has the AP information in which the SSID "ap200", the password "PPP1", and the status "Connected" are associated with each other stored in the connection table 42 (see FIG. 1) and further has the WFD connection information 40 including the SSID "wfd", the password "QQQ1", and the BSSID "Mw" (see FIG. 1) stored therein.

When the user brings the mobile terminal 10 close to the printer 100, the printer 100 sends an NDEF signal to the mobile terminal 10. Ma information and Mw information in the NDEF signal are the same as those of the cases B to D in FIGS. 2 and 3.

Since the mobile terminal 10 sends a PING signal that includes the IP address "IPa" included in the Ma information in the NDEF signal as its destination and receives a PING response from the printer 100, the mobile terminal 10 determines that both of the mobile terminal 10 and the printer 100 have established the AP connections with the same AP 200. Further, since the mobile terminal 10 stores the WFD connection information 40 that includes an SSID and a BSSID identical to the SSID "wfd" and the BSSID "Mw" included in the Mw information in the NDEF signal, the mobile terminal 10 determines that the WFD connection is established with the printer 100. In this case, the mobile terminal 10 disconnects the WFD connection with the printer 100 (see (1)). Then, the mobile terminal 10 executes a wireless communication with the printer 100 via the AP 200 (see (2)).

As illustrated in the case F, in the situation where both of the mobile terminal 10 and the printer 100 have established the AP connections with the same AP 200 and the mobile terminal 10 has established the WFD connection with the printer 100, the mobile terminal 10 disconnects the WFD connection with the printer 100 and executes the wireless communication with the printer 100 via the AP 200. Since the WFD connection with the printer 100 is disconnected, the mobile terminal 10 does not need to execute a communication of a signal for maintaining the WFD connection with the printer 100. As a result, the processing load of the mobile terminal 10 can be reduced.

Figure 5:
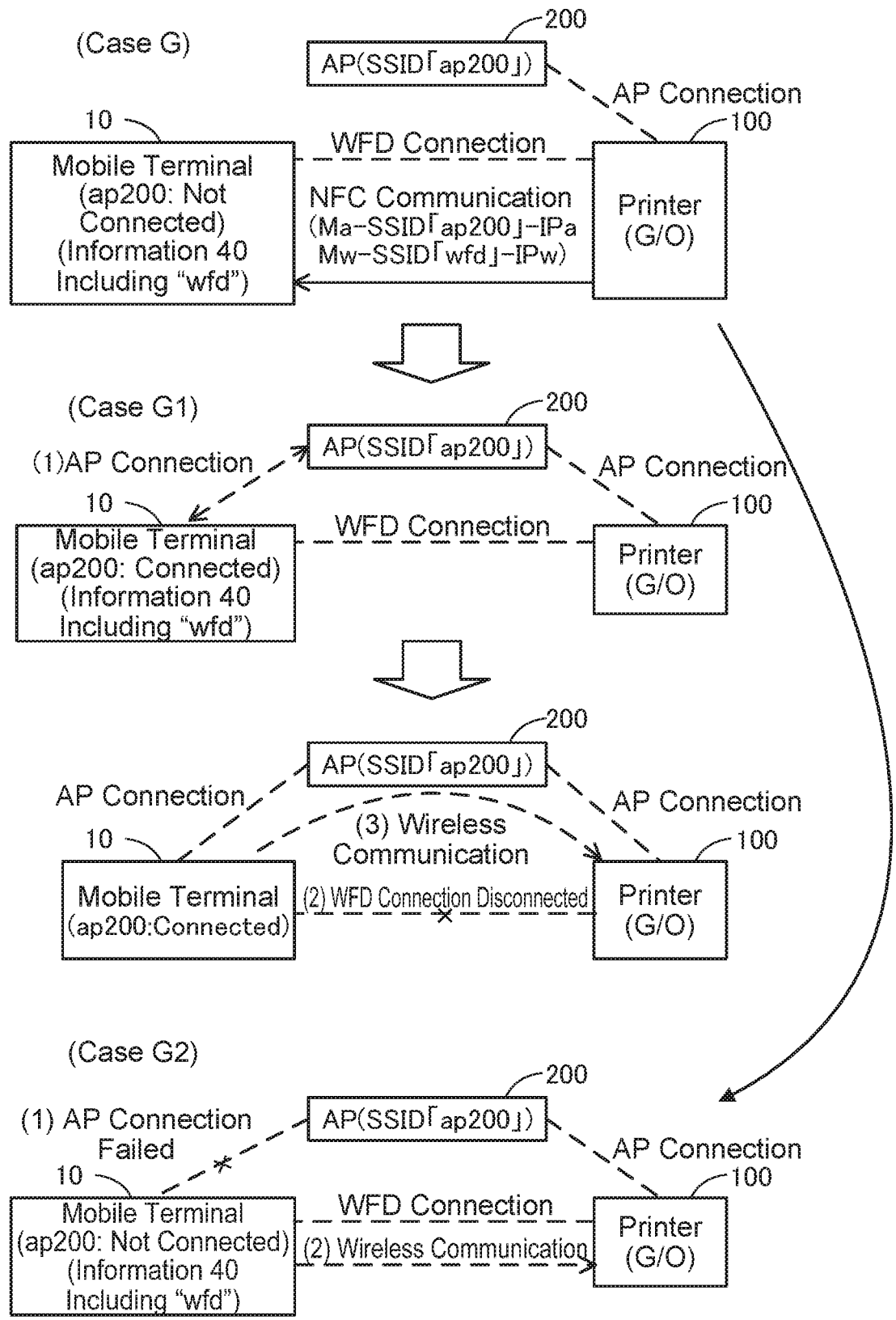
FIG. 5 shows a sequence diagram of a case G1 in which the mobile terminal 10 disconnects the WFD connection, and a sequence diagram of a case G2 in which the mobile terminal 10 maintains the WFD connection.

Case G: FIG. 5

The initial state of the case G in FIG. 5 is the same as that of the case F in FIG. 4, except that an AP connection is not established between the mobile terminal 10 and the AP 200. Further, there is a history that an AP connection was established in the past between the mobile terminal 10 and the AP 200. In this state, the mobile terminal 10 has stored therein AP information in which the SSID "ap200", the password "PPP1", and the status "Not Connected" are associated with each other in the connection table 42 and further has the WFD connection information 40 including the SSID "wfd", the password "QQQ1", and the BSSID "Mw" stored therein.

When the user brings the mobile terminal 10 close to the printer 100, the printer 100 sends an NDEF signal to the mobile terminal 10. Ma information and Mw information in the NDEF signal are the same as those of the case F in FIG. 4.

Case G1

The mobile terminal 10 sends a PING signal that includes the IP address "IPa" included in the Ma information in the NDEF signal as its destination, but does not receive a PING response. Therefore, the mobile terminal 10 determines that an AP connection with the AP 200 is not established. Further, the mobile terminal 10 determines that the connection table 42 includes an SSID identical to the SSID "ap200" included in the Ma information in the NDEF signal, and determines that the SSID "ap200" is associated with the status "Not Connected" in the connection table 42. Due to this, the mobile terminal 10 determines that it can establish an AP connection with the AP 200. In addition, since the mobile terminal 10 stores the WFD connection information 40 that includes an SSID and a BSSID identical to the SSID "wfd" and the BSSID "Mw" included in the Mw information in the NDEF signal, the mobile terminal 10 determines that the WFD connection is established with the printer 100. In this case, the mobile terminal 10 attempts to establish an AP connection with the AP 200, and in the present case, the mobile terminal 10 establishes the AP connection (see (1)). Next, the mobile terminal 10 disconnects the WFD connection with the printer 100 (see (2)). Then, the mobile terminal 10 executes a wireless communication with the printer 100 via the AP 200. (see (3)).

As illustrated in the case G1, in the situation where the mobile terminal 10 can establish an AP connection with the AP 200 and the mobile terminal 10 has established the WFD connection with the printer 100, the mobile terminal 10 firstly attempts to establish an AP connection with the AP 200. Then, in a case where the establishment of AP connection with the AP 200 succeeds, the mobile terminal 10 disconnects the WFD connection with the printer 100 and executes the wireless communication with the printer 100 via the AP 200. Since the WFD connection with the printer 100 is disconnected, the mobile terminal 10 does not need to execute a communication of the signal for maintaining the WFD connection with the printer 100. As a result, the processing load of the mobile terminal 10 can be reduced. Here, reasons why the mobile terminal 10 prioritizes the AP connection over the WFD connection will be described. For example, a number of child stations capable of participating in the APNW formed by the AP 200 is usually larger than a number of child stations capable of participating in the WFDNW formed by the printer 100. Therefore, by using the AP connection, the mobile terminal 10 may be able to execute wireless communications with a large number of child stations via the AP 200. Further, the AP 200, which is to form a noninterrupted wireless LAN, is less likely to be turned off, whereas the printer 100 may be turned off, for example, when printing is not executed. Due to this, the AP connection is less likely to be disconnected as compared to the WFD connection.

Case G2

The mobile terminal 10 attempts to establish an AP connection with the AP 200, however, the establishment of AP connection fails (see (1)). The establishment of AP connection between the mobile terminal 10 and the AP 200 may fail, for example, under a situation where radio wave condition between the mobile terminal 10 and the AP 200 is temporarily bad. In this case, the mobile terminal 10 maintains the WFD connection with the printer 100 and executes a wireless communication with the printer 100 by using the WFD connection (see (2)).

As illustrated in the case G2, when the mobile terminal 10 attempts to establish an AP connection with the AP 200 and fails to establish the same, the mobile terminal 10 does not disconnect the WFD connection with the printer 100 and executes the wireless communication with the printer 100 by using the WFD connection. If the mobile terminal 10 is configured to attempt to establish an AP connection after having disconnected the WFD connection, the mobile terminal 10 needs to re-establish the WFD connection when failing to establish the AP connection. According to the above-mentioned configuration, when the mobile terminal 10 fails to establish the AP connection with the AP 200, it can maintain the WFD connection and execute the wireless communication with the printer 100. Therefore, there is no need to take time for re-establishment of the WFD connection and the wireless communication with the printer 100 can be executed promptly.

Figure 6:
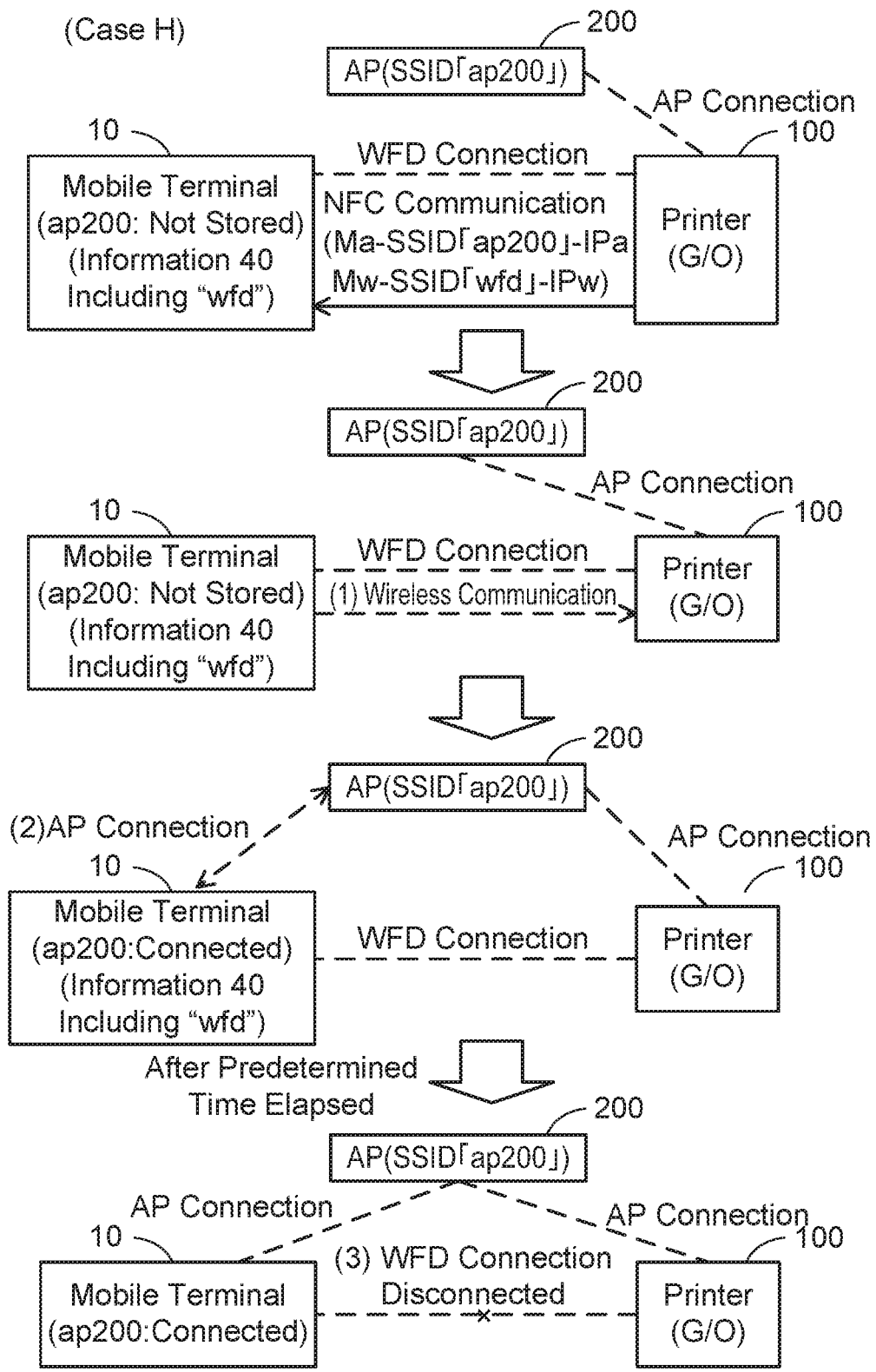
FIG. 6 shows a sequence diagram of a case H in which the mobile terminal 10 disconnects the WFD connection after a predetermined time has elapsed.

Case H: FIG. 6

The initial state of the case H in FIG. 6 is the same as that of the case G, except that there is no history that an AP connection was established between the mobile terminal 10 and the AP 200. In this state, the mobile terminal 10 does not store AP connection information including the SSID "ap200" in the table 42.

When the user brings the mobile terminal 10 close to the printer 100, the printer 100 sends an NDEF signal to the mobile terminal 10. Ma information and Mw information in the NDEF signal are the same as those of the case G in FIG. 5.

The mobile terminal 10 sends a PING signal that includes the IP address "IPa" included in the Ma information in the NDEF signal as its destination, but does not receive a PING response. Thus, the mobile terminal 10 determines that an AP connection with the AP 200 is not established. Further, since the connection table 42 does not include an SSID identical to the SSID "ap200" included in the Ma information in the NDEF signal, the mobile terminal 10 determines that it cannot establish an AP connection with the AP 200 with which the printer 100 establishes the AP connection. In addition, since the mobile terminal 10 stores the WFD connection information 40 that includes an SSID and a BSSID identical to the SSID "wfd" and the BSSID "Mw" included in the Mw information in the NDEF signal, the mobile terminal 10 determines that the WFD connection is established with the printer 100. In this case, the mobile terminal 10 maintains the WFD connection with the printer 100. Then, the mobile terminal 10 executes a wireless communication with the printer 100 by using the WFD connection (see (1)).

Thereafter, when the user performs an operation for establishing an AP connection with the AP 200 in the terminal operation unit, an AP connection is established between the mobile terminal 10 and the AP 200 (see (2)). As a result, a state where both of the mobile terminal 10 and the printer 100 have established the AP connections with the same AP 200, and the mobile terminal 10 has established the WFD connection with the printer 100 is achieved.

After a predetermined time has elapsed since the aforementioned wireless communication (1) was completed, the mobile terminal 10 resends the PING signal that includes the IP address "IPa" included in the Ma information in the NDEF signal as its destination. In this case, since the mobile terminal 10 receives the PING response from the printer 100, the mobile terminal 10 determines that the state has been changed to the state where both of the mobile terminal 10 and the printer 100 have established the AP connections with the same AP 200. In this case, the mobile terminal 10 disconnects the WFD connection with the printer 100 (see (3)).

As illustrated in the case H, the mobile terminal 10 disconnects the WFD connection with the printer 100 in the case where the AP connection is established between the mobile terminal 10 and the AP 200 after the wireless communication between the mobile terminal 10 and the printer 100 using the WFD connection had been completed. The mobile terminal 10 does not need to execute a communication of the signal for maintaining the WFD connection with the printer 100, as a result of which the processing load of the mobile terminal 10 can be reduced.

Figure 7:
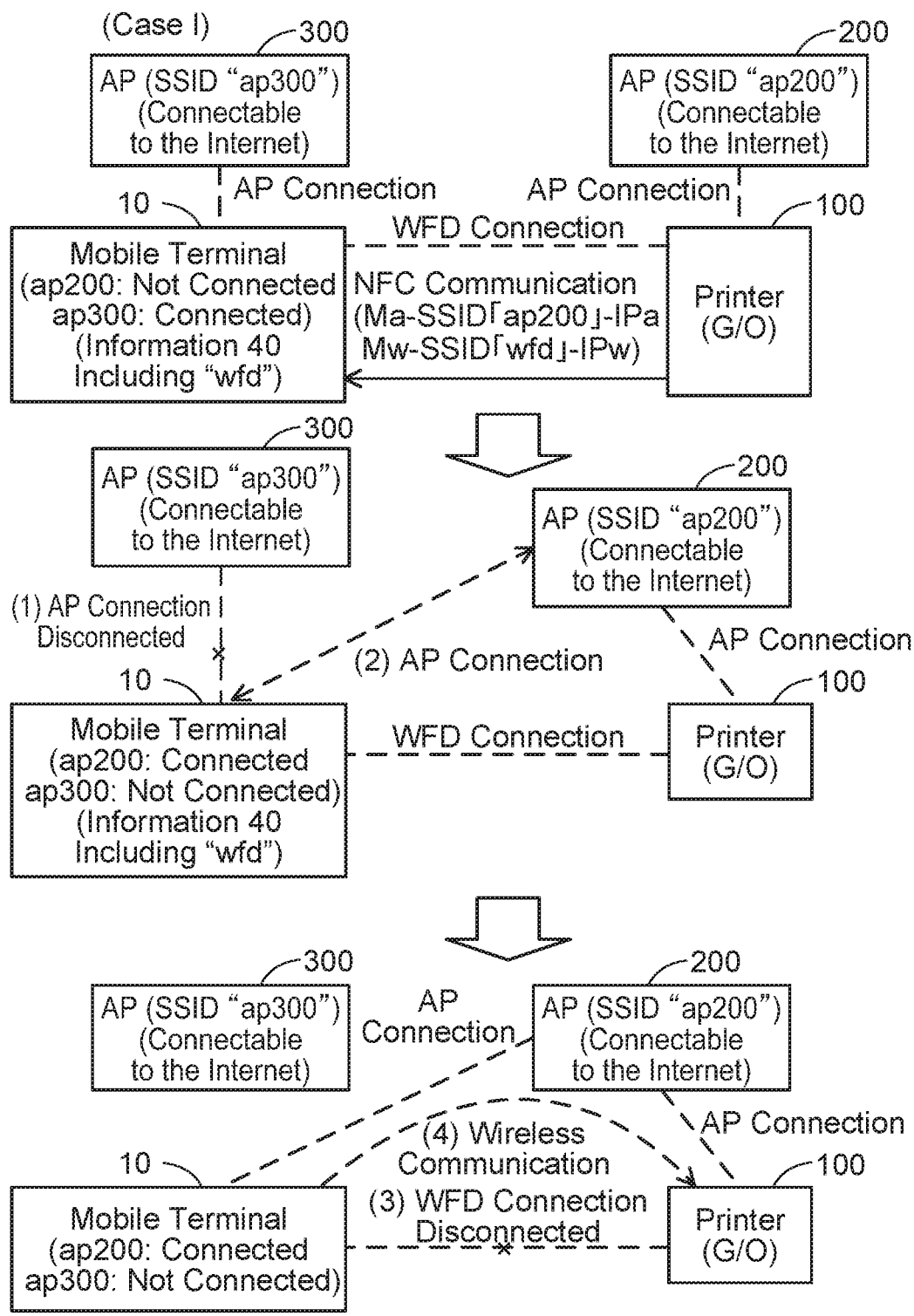
FIG. 7 shows a sequence diagram of a case I in which the mobile terminal 10 establishes the AP connection with the AP 200 after having disconnected an AP connection with an AP 300.

Case I: FIG. 7

In the initial state of the case I, a WFD connection is established between the mobile terminal 10 and the printer 100, an AP connection is established between the mobile terminal 10 and an AP 300, and an AP connection is established between the printer 100 and the AP 200. In this case, the mobile terminal 10 has AP connection information stored in the connection table 42 (see FIG. 1), where the AP connection information has the SSID "ap200", the password "PPP1", and the status "Not Connected" associated with each other, and further has AP information in which an SSID "ap300", a password "PPP2", and the status "Connected" are associated with each other stored therein. The mobile terminal 10 further has the WFD connection information 40 including the SSID "wfd", the password "QQQ1", and the BSSID "Mw" (see FIG. 1) stored therein.

When the user brings the mobile terminal 10 close to the printer 100, the printer 100 sends an NDEF signal to the mobile terminal 10. Ma information and Mw information in the NDEF signal are the same as those of the case H in FIG. 6.

Since the mobile terminal 10 stores the WFD connection information 40 that includes an SSID and a BSSID identical to the SSID "wfd" and the BSSID "Mw" included in the Mw information in the NDEF signal, the mobile terminal 10 determines that the WFD connection with the printer 100 is established. Further, since the mobile terminal 10 sends a PING signal that includes the IP address "IPa" included in the Ma information in the NDEF signal as its destination, but does not receive a PING response. Thus, the mobile terminal 10 determines that an AP connection with the AP 200 is not established. In addition, the mobile terminal 10 determines that the connection table 42 includes an SSID identical to the SSID "ap200" included in the Ma information in the NDEF signal, determines that the SSID "ap200" is associated with the status "Not Connected" in the connection table 42, and determines that the SSID "ap300" is associated with the status "Connected" in the connection table 42. In this case, the mobile terminal 10 disconnects the AP connection with the AP 300 (see (1)). Then, the mobile terminal 10 establishes an AP connection with the AP 200 (see (2)).

Next, the mobile terminal 10 disconnects the WFD connection with the printer 100 (see (3)). Then, the mobile terminal 10 executes a wireless communication with the printer 100 via the AP 200 (see (4)). Further, the mobile terminal 10 accesses a predetermined URL in a predetermined server on the Internet via the AP 200 and determines that the AP 200 is already connected to the Internet. In this case, the mobile terminal 10 maintains the AP connection with the AP 200.

As illustrated in the case I, in the situation where the mobile terminal 10 has established the AP connection with the AP 300, the mobile terminal 10 can establish the AP connection with the AP 200, and the mobile terminal 10 also has established the WFD connection with the printer 100, the mobile terminal 10 disconnects the AP connection with the AP 300 and establishes the AP connection with the AP 200. Then, the mobile terminal 10 disconnects the WFD connection with the printer 100 and executes the wireless communication with the printer 100 via the AP 200. The mobile terminal 10 does not need to execute a communication of the signal for maintaining the WFD connection with the printer 100, as a result of which the processing load of the mobile terminal 10 can be reduced. Further, in the case of determining the AP 200 is already connected to the Internet, the mobile terminal 10 maintains the AP connection with the AP 200. Due to this, the mobile terminal 10 can access the Internet via the AP 200 after the wireless communication with the printer 100 has been completed.

Figure 8:
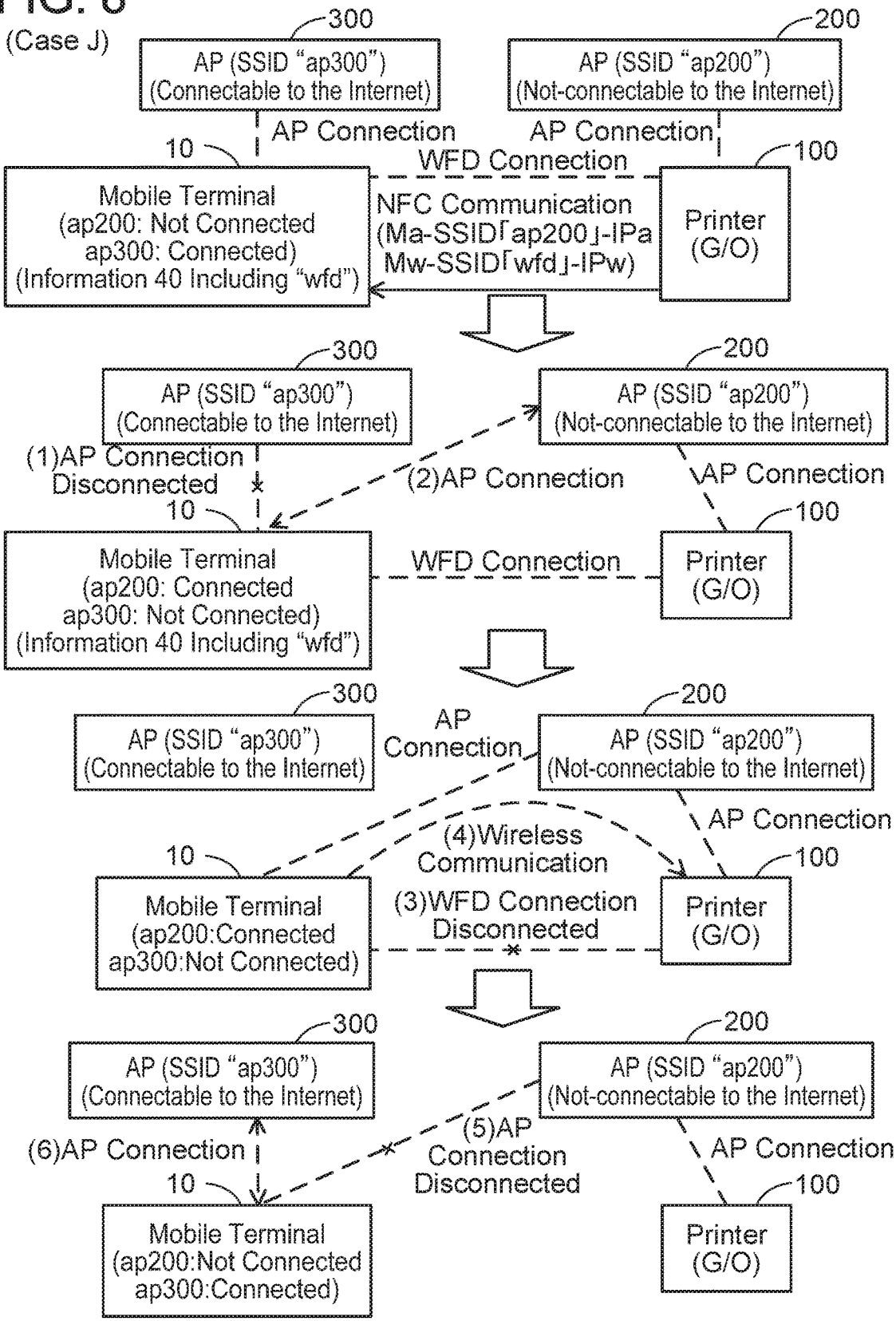
FIG. 8 shows a sequence diagram of a case J in which the mobile terminal 10 re-establishes the AP connection with the AP 300 after having disconnected the AP connection with the AP 300.

Case J: FIG. 8

The initial state of the case J is the same as that of the case I, except that the AP 200 is not being connected to the Internet.

When the user brings the mobile terminal 10 close to the printer 100, the printer 100 sends an NDEF signal to the mobile terminal 10. Ma information and Mw information in the NDEF signal are the same as those of the case I in FIG. 7. Processes (1) to (4) executed thereafter are the same as those of the case I in FIG. 7. However, the mobile terminal 10 accesses a predetermined URL via the AP 300 and determines that the AP 300 is connected to the Internet before disconnecting the AP connection with the AP 300 in the process (1). The mobile terminal 10 attempts to access the predetermined URL via the AP 200 after the wireless communication with the printer 100 has been completed in the process (4), however, the mobile terminal 10 cannot access the URL. Thus, the mobile terminal 10 determines that the AP 200 is not connected to the Internet. In this case, the mobile terminal 10 disconnects the AP connection with the AP 200 (see (5)). Then, the mobile terminal 10 re-establishes the AP connection with the AP 300 (see (6)).

As illustrated in the case J, in the case where the AP 300 is connected to the Internet and the AP 200 is not connected to the Internet, the mobile terminal 10 disconnects the AP connection with the AP 200 and re-establishes the AP connection with the AP 300. Due to this, the mobile terminal 10 can access the Internet via the AP 300.

Figure 9:
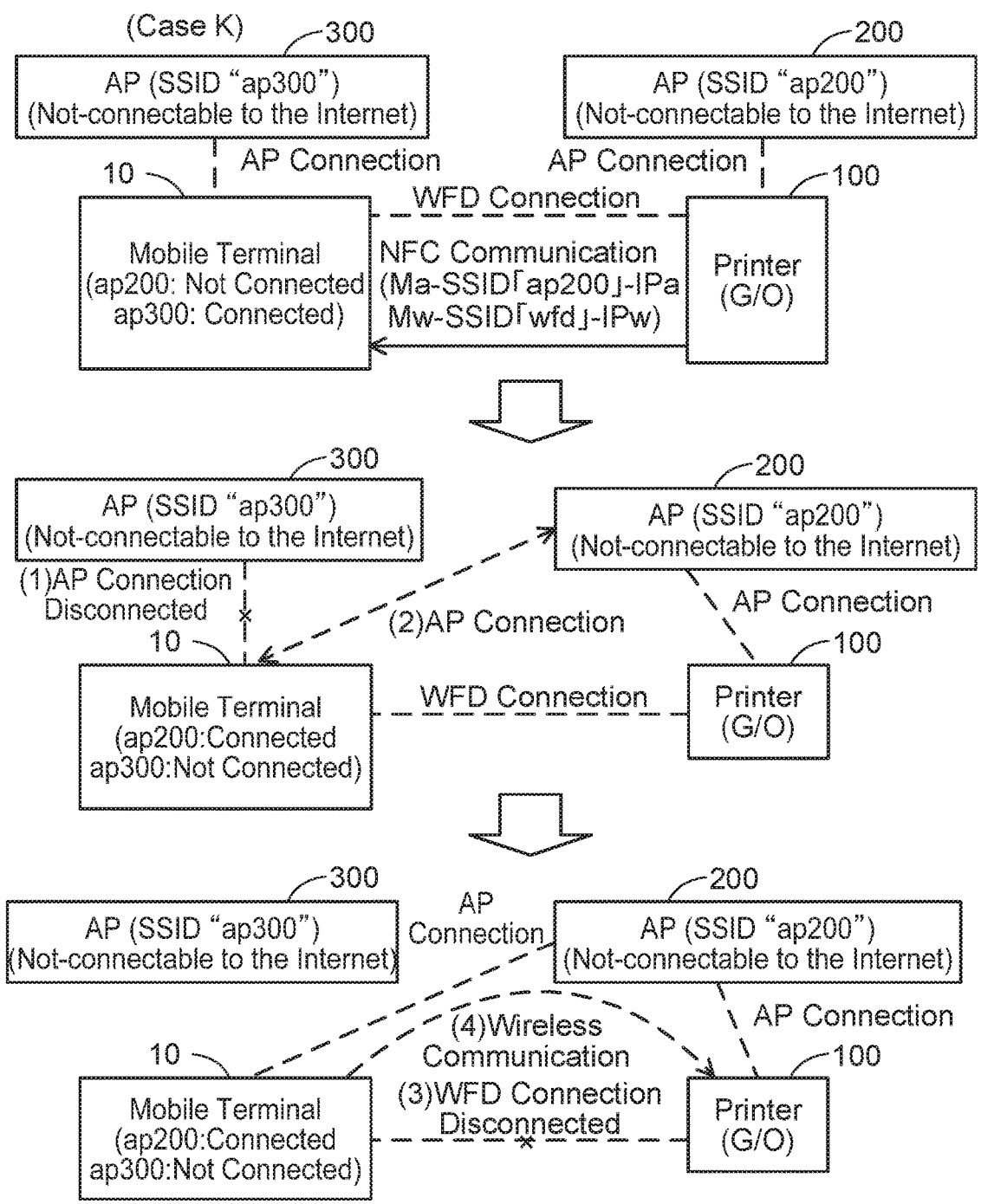
FIG. 9 shows a sequence diagram of a case K in which the mobile terminal 10 does not re-establish the AP connection with the AP 300 after having disconnected the AP connection with the AP 300.

Case K: FIG. 9

The initial state of the case K is the same as that of the case I, except that both of the AP 200 and the AP 300 are not connected to the Internet.

When the user brings the mobile terminal 10 close to the printer 100, the printer 100 sends an NDEF signal to the mobile terminal 10. Ma information and Mw information in the NDEF signal are the same as those of the case J in FIG. 8.

Although the mobile terminal 10 attempts to access a predetermined URL via the AP 300, it cannot access the URL. Thus, the mobile terminal 10 determines that the AP 300 is not connected to the Internet. Processes (1) to (4) executed thereafter are the same as the processes (1) to (4) of the case I. Then, although the mobile terminal 10 attempts to access the predetermined URL via the AP 200, it cannot access the URL, and thus the mobile terminal 10 determines that the AP 200 is not connected to the Internet. In this case, the mobile terminal 10 maintains the AP connection with the AP 200.

As illustrated in the case K, in the case where both of the AP 200 and the AP 300 are not connected to the Internet, the mobile terminal 10 maintains the AP connection with the AP 200. Due to this, the mobile terminal 10 can execute the wireless communication with the printer 100 via the AP 200, again.

In the initial states of the aforementioned cases B to D and F to K, the AP connection is established between the Wi-Fi I/F 120 of the printer 100 and the AP 200. Instead of this, an AP connection may be established between the wired I/F 124 of the printer 100 and the AP 200. In this case, the mobile terminal 10 can execute the same processes as those of the cases B to D and F to K by using the wired information in the NDEF signal instead of the Ma information in the NDEF signal.

Figure 10:
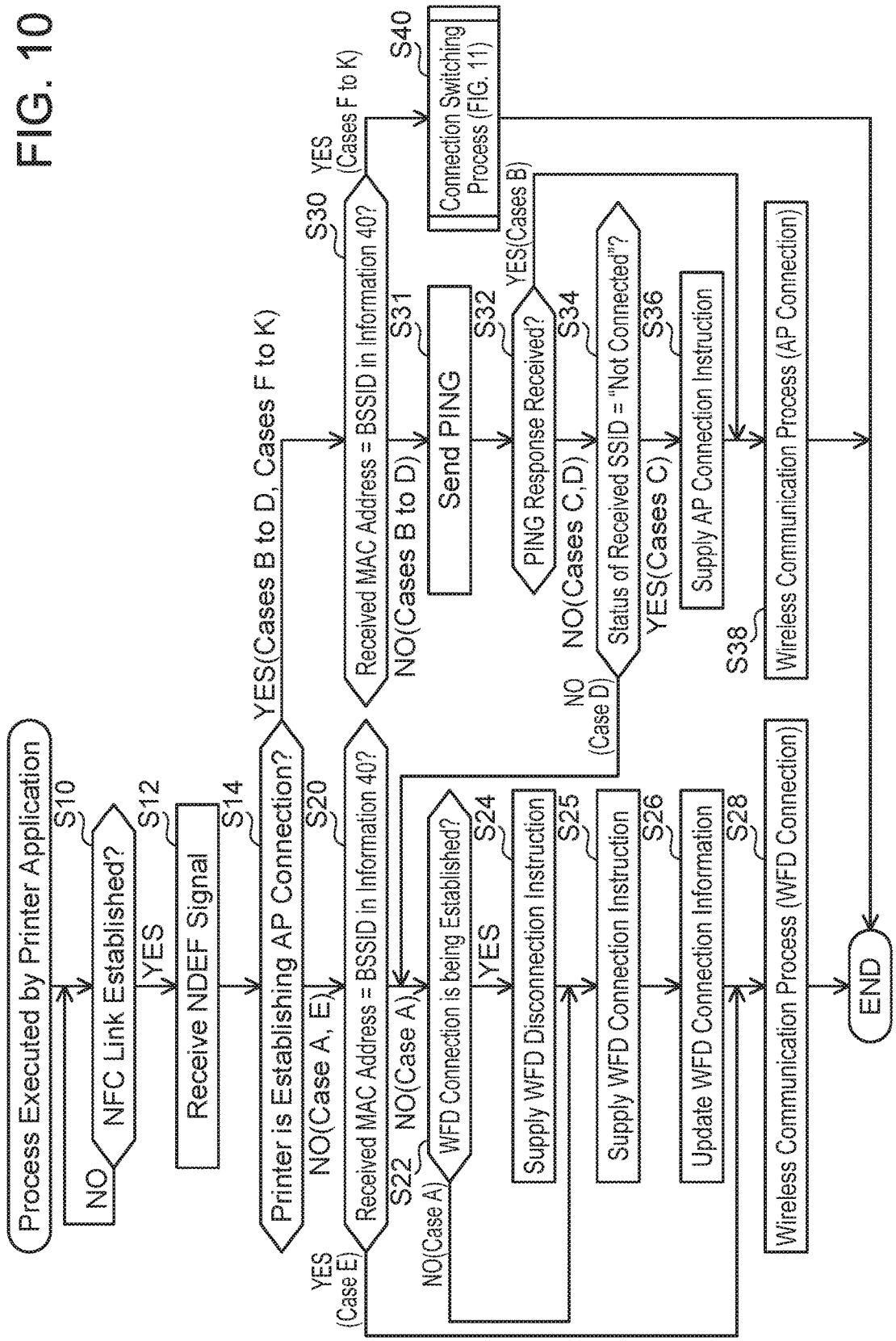
FIG. 10 shows a flowchart of process executed by a printer application 38 of the mobile terminal 10.

Process Executed by Mobile Terminal 10: FIG. 10

Next, referring to FIG. 10, contents of a process executed by the CPU 32 of the mobile terminal 10 according to the app 38 will be described. The process of FIG. 10 starts when an operation for activating the app 38 is performed in the operation unit 12 of the mobile terminal 10. Hereinafter, for the sake of expedience, "app 38" and "OS 36" will be used respectively as a subject of action for process executed by the mobile terminal 10 according to the app 38 and as a subject of action for process executed by the mobile terminal 10 according to the OS program 36. Hereinafter, a case where an NFC link is established between the mobile terminal 10 and the printer 100 will be described as an example.

In S10, the app 38 monitors whether an NFC link is established between the mobile terminal 10 and the printer 100. In a case of acquiring NFC establishment information indicating that an NFC link has been established from the NFC I/F 22, the app 38 determines YES in S10 and proceeds to S12.

In S12, the app 38 receives an NDEF signal that includes AP information, WFD information, and wired information from the printer 100 via the NFC I/F 22.

In S14, the app 38 determines whether the printer 100 has an AP connection with an AP established. In a case where the AP information and the wired information included in the NDEF signal are empty information "Not Used" (case A in FIG. 2, case E in FIG. 4), the app 38 determines NO in S14 and proceeds to S20, whereas in a case where at least one of the AP information and the wired information is not empty information (case B in FIG. 2, cases C and D in FIG. 3, cases F to K in FIGS. 4 to 9), the app 38 determines YES in S14 and proceeds to S30.

In S20, the app 38 determines whether a MAC address in Mw information included in the received NDEF signal is identical to a BSSID in the WFD connection information 40. In a case where the received MAC address is not identical to the BSSID in the WFD connection information 40 (case A in FIG. 2), the app 38 determines NO in S20 and proceeds to S22, whereas in a case where the received MAC address is identical to the BSSID in the WFD connection information 40 (case E in FIG. 4), the app 38 determines YES in S20, skips S22 to S26, and proceeds to S28.

In S22, the app 38 determines whether a WFD connection is established with a device different from the printer 100. In a case where the WFD connection information 40 is not empty (YES in S22), the app 38 proceeds to S24, whereas the WFD connection information 40 is empty (NO in S22, case A in FIG. 2), the app 38 skips S24 and proceeds to S25.

In S24, the app 38 supplies a WFD disconnection instruction to the OS 36. The WFD disconnection instruction is an instruction for requesting disconnection of a WFD connection. When acquiring the WFD disconnection instruction, the OS 36 sends a disconnection request via the Wi-Fi I/F 20 to the device with which the WFD connection is established so as to disconnect the WFD connection with that device.

In S25, the app 38 supplies a WFD connection instruction to the OS 36. The WFD connection instruction is an instruction for requesting establishment of a WFD connection with the printer 100 to which the received MAC address is assigned. When acquiring the WFD connection instruction, the OS 36 executes the WFD connection process (communications of Probe signal, WSC Exchange, Authentication, Association, 4-way Handshake, and the like) with the printer 100. As a result, a WFD connection is established between the mobile terminal 10 and the printer 100. The app 38 receives the SSID "wfd" and the password "QQQ1" from the printer 100 in the WSC Exchange.

In S26, the app 38 updates the WFD connection information 40. The app 38 stores the received MAC address, the SSID "wfd", and the password "QQQ1" in the memory 34 as the WFD connection information 40.

In S28, the app 38 executes a wireless communication with the printer 100 by using the WFD connection. When S28 ends, the process of FIG. 10 ends.

S30 is the same as S20. In a case of determining NO in S30 (case B in FIG. 2, cases C and D in FIG. 3), the app 38 proceeds to S31, whereas in a case of determining YES in S30 (cases F to K in FIGS. 4 to 9), the app 38 proceeds to S40.

In S31, the app 38 sends a PING signal that includes an IP address in Ma information included in the received NDEF signal as its destination.

In S32, the app 38 determines whether the app 38 receives a PING response to the PING signal. In a case where both of the mobile terminal 10 and the printer 100 are connected to the same AP, the app 38 receives a PING response from the printer 100. In a case of receiving the PING response (case B in FIG. 2), the app 38 determines YES in S32 and proceeds to S38, whereas in a case of not receiving the PING response (cases C and D in FIG. 3), the app 38 determines NO in S32 and proceeds to S34.

In S34, the app 38 determines, referring to the connection table 42, whether the status "Not Connected" is associated with an SSID in the Ma information included in the received NDEF signal. In a case where the status "Not Connected" is associated with the received SSID (case C in FIG. 3), the app 38 determines YES in S34 and proceeds to S36. On the other hand, in a case where the status "Not Connected" is not associated with the received SSID (case D in FIG. 3), the app 38 determines NO in S34 and proceeds to S22. The case where the status "Not Connected" is not associated with the received SSID is a case where AP information including the received SSID is not stored in the connection table 42, that is, a case where there is no history that an AP connection with the AP having the received SSID was established in the past.

In S36, the app 38 supplies an AP connection instruction to the OS 36. The AP connection instruction is an instruction for requesting establishment of an AP connection with an AP having an SSID in Ma information. The OS 36 establishes an AP connection with the AP by using the SSID and the password in the connection table 42. As a result, the AP connection is established between the mobile terminal 10 and the AP.

In S38, the app 38 executes a wireless communication with the printer 100 via the AP with which the AP connection was established in S36. When S38 ends, the process of FIG. 10 ends.

In S40, the app 38 executes a connection switching process (FIG. 11) for switching wireless connections with the printer 100. When S40 ends, the process of FIG. 10 ends.

Figure 11:
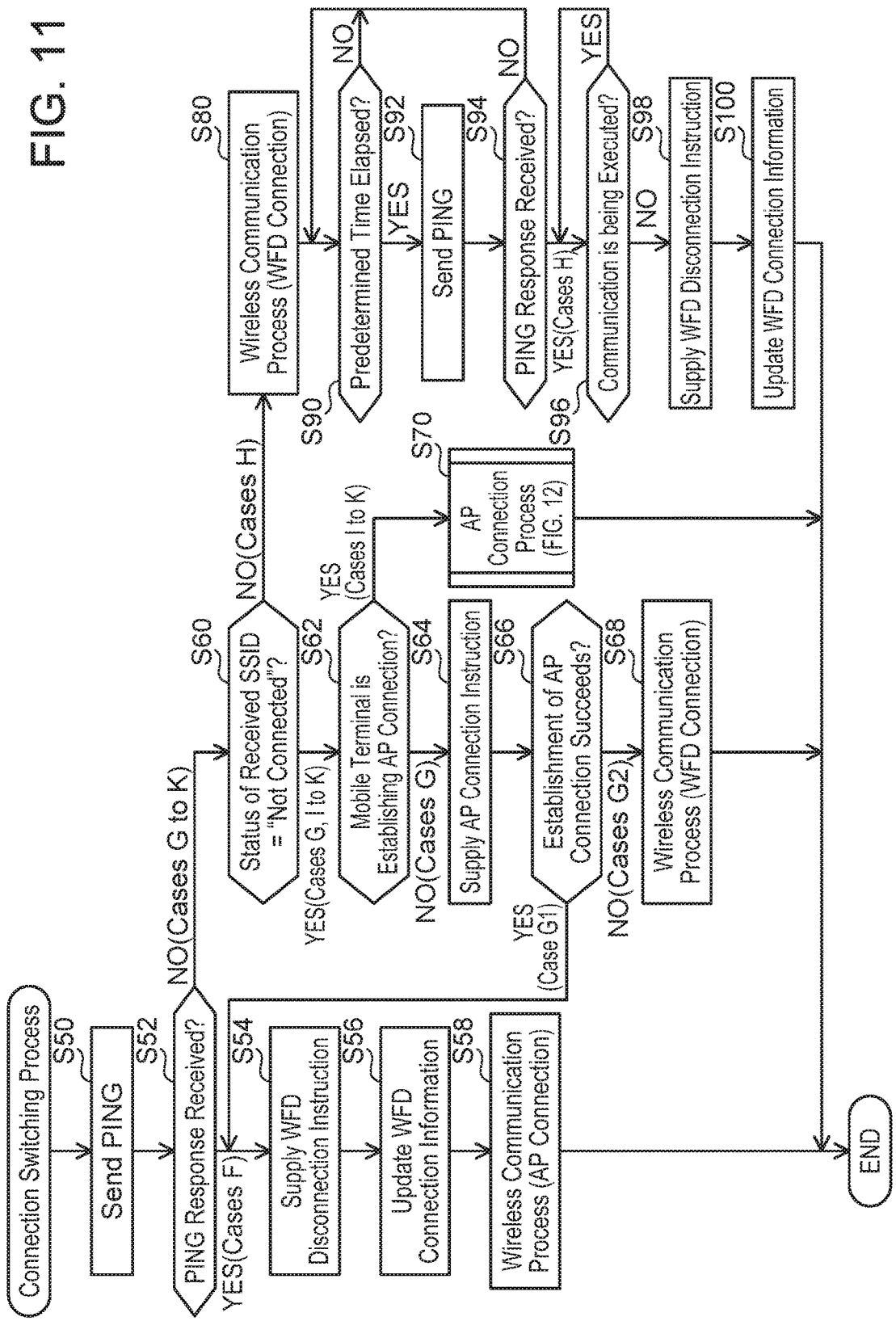
FIG. 11 shows a flowchart of connection switching process.

Connection Switching Process: FIG. 11

Next, referring to FIG. 11, the connection switching process executed in S40 of FIG. 10 will be described. Hereinafter, a case where an AP connection is already established between the printer 100 and the AP 200 will be described as an example.

S50 and S52 are the same as S30 and S31 in FIG. 10, respectively. In a case of determining YES in S52 (case F in FIG. 4), the app 38 proceeds to S54, whereas in a case of determining NO in S52 (cases G to K in FIGS. 5 to 9), the app 38 proceeds to S60. S54, S56, and S58 are the same as S24, S26, and S38 in FIG. 10, respectively. As a result, the WFD connection between the mobile terminal 10 and the printer 100 is disconnected, and the AP connection between the mobile terminal 10 and the AP 200 is maintained.

S60 is the same as S34 in FIG. 10. In a case where the status "Not Connected" is associated with the SSID "ap200" (case G in FIG. 5, cases I to K in FIGS. 7 to 9), the app 38 determines YES in S60 and proceeds to S62, whereas in a case where the status "Not Connected" is not associated with the SSID "ap200" (case H in FIG. 6), the app 38 determines NO in S60 and proceeds to S80.

In S62, the app 38 determines, referring to the connection table 42, whether an AP connection with an AP different from the AP 200 is established. In a case where an SSID associated with the status "Connected" is present in the connection table 42 (cases I to K in FIGS. 7 to 9), the app 38 determines YES in S62 and proceeds to S70. On the other hand, in a case where an SSID associated with the status "Connected" is not present in the connection table 42 (case G in FIG. 5), the app 38 determines NO in S62 and proceeds to S64.

S64 is the same as S36 in FIG. 10. In S66, the app 38 determines whether an AP connection has been established with the AP 200. In a case of acquiring AP establishment information indicating that an AP connection has been established with the AP 200 from the OS 36 (case G1 in FIG. 5), the app 38 determines YES in S66 and proceeds to S54. In this case, the WFD connection between the mobile terminal 10 and the printer 100 is disconnected. On the other hand, in a case of not acquiring the AP establishment information despite a fact that the AP connection instruction is supplied to the OS 36 (case G2 in FIG. 5), the app 38 determines NO in S66 and proceeds to S68. The case where an AP connection is not established with the AP 200 despite the supply of AP connection instruction to the OS 36 by the app 38 is a case where radio wave condition between the mobile terminal 10 and the AP 200 is bad, for example. In this case, the WFD connection between the mobile terminal 10 and the printer 100 is maintained. S68 is the same as S28 in FIG. 10.

In S70, the app 38 executes an AP connection process for establishing an AP connection with the AP 200. When S70 ends, the process of FIG. 11 ends.

In S80, the app 38 executes a wireless communication with the printer 100 by using the WFD connection.

In S90, the app 38 monitors whether a predetermined time has elapsed since the PING signal was sent. In a case where the predetermined time has elapsed since the PING signal was sent, the app 38 determines YES in S90 and proceeds to S92. S92 and S94 are the same as S50 and S52, respectively. In a case of determining YES in S94 (case H in FIG. 6), the app 38 proceeds to S96, whereas in a case of determining NO in S94, the app 38 returns to S90. The case of determining YES in S94 is a case where an operation for establishing an AP connection between the mobile terminal 10 and the AP 200 is performed by the user in the terminal operation unit of the mobile terminal 10 after the process of S80 has been completed (see (2) of case H in FIG. 6), for example In S96, the app 38 determines whether a wireless communication is being executed with the printer 100 by using the WFD connection. A case where a wireless communication is being executed with the printer 100 by using the WFD connection is a case where print data is being sent to the printer, for example. In a case where a wireless communication is not being executed with the printer 100 by using the WFD connection, the app 38 determines NO in S96 and proceeds to S98. On the other hand, in a case where a wireless communication is being executed with the printer 100 by using the WFD connection (YES in S96), the app 38 waits in S96 until the wireless communication is completed. Then, when the wireless communication using the WFD connection with the printer 100 is completed, the app 38 determines NO in S96 and proceeds to S98. S98 and S100 are the same as S54 and S56, respectively. When S100 ends, the process of FIG. 11 ends. If the WFD connection is disconnected while the wireless communication is being executed between the mobile terminal 10 and the printer 100 by using the WFD connection, the wireless communication is not executed appropriately. In this case, an image represented by print data may not be printed, for example. Since the WFD connection is disconnected after the wireless communication using the WFD connection between the mobile terminal 10 and the printer 100 has been completed, the wireless communication using the WFD connection between the mobile terminal 10 and the printer 100 can be appropriately completed.

Figure 12:
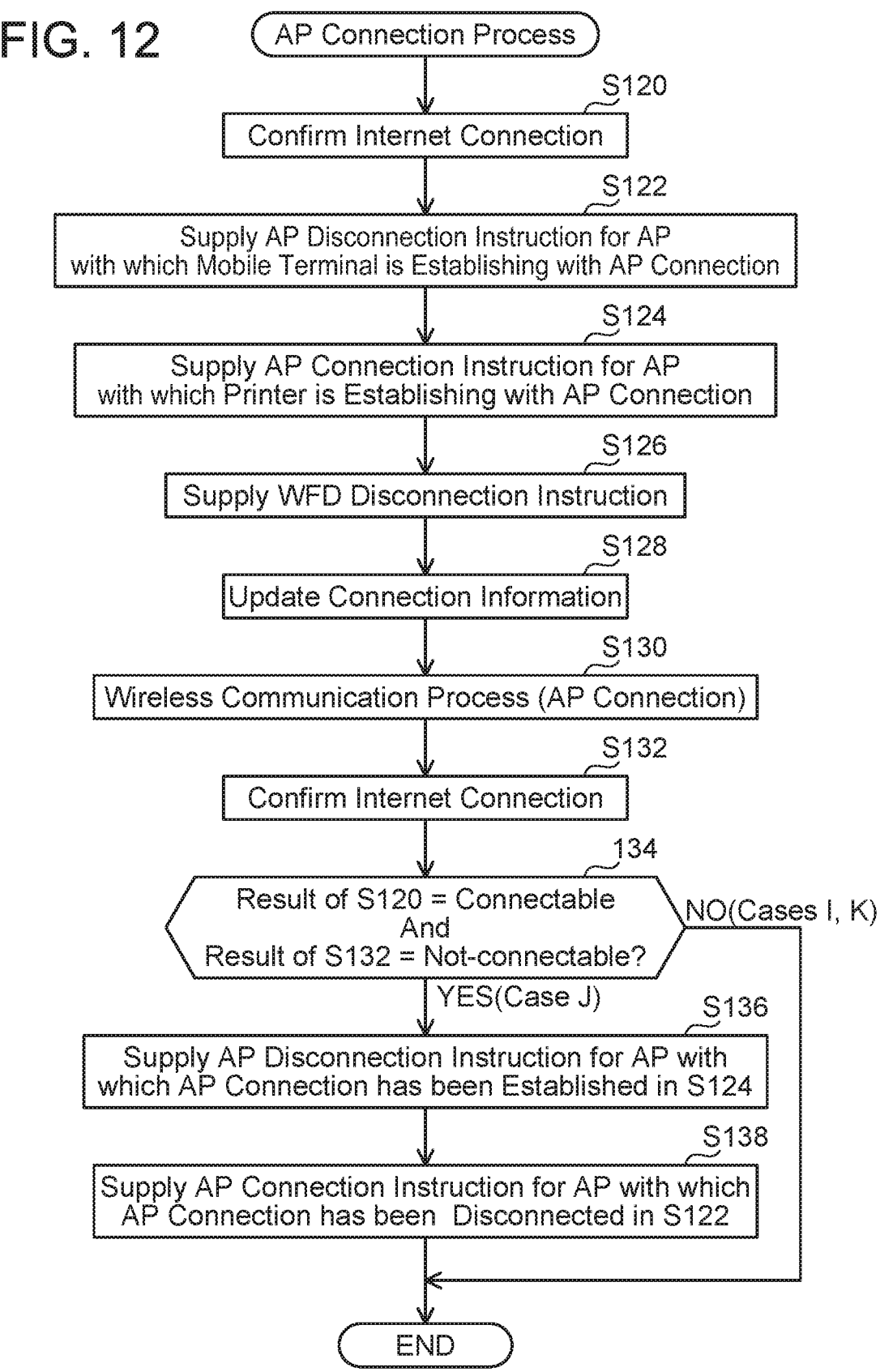
FIG. 12 shows a flowchart of AP connection process.

AP Connection Process: FIG. 12

Next, referring to FIG. 12, the AP connection process executed in S70 of FIG. 11 will be described. Hereinafter, a case where an AP connection is established between the mobile terminal 10 and the AP 300 as well as between the printer 100 and the AP 200 will be described as an example (see cases I to K in FIGS. 7 to 9).

In S120, the app 38 checks whether the AP 300 is connected to the Internet. The app 38 attempts to access a predetermined URL in a server on the Internet via the AP 300. In a case of being able to access the URL, the app 38 determines that the AP 300 is connected to the Internet (i.e., connectable), whereas in a case of being unable to access the URL, the app 38 determines that the AP 300 is not connected to the Internet (i.e., not-connectable). The app 38 stores the check result (connectable or not-connectable) temporarily.

In S122, the app 38 supplies an AP disconnection instruction for requesting disconnection of an AP connection to the OS 36. When acquiring the AP disconnection instruction, the OS 36 disconnects the AP connection with the AP 300. Due to this, the AP connection between the mobile terminal 10 and the AP 300 is disconnected. As a result, the status of the SSID "ap300" in the connection table 42 is updated to "Not Connected" from "Connected".

S124 is the same as S64 in FIG. 11. An AP connection is thereby established between the mobile terminal 10 and the AP 200. As a result, the status of the SSID "ap200" in the connection table 42 is updated to "Connected" from "Not Connected". S126, S128, and S130 are the same as S54, S56, and S58.

In S132, the app 38 checks whether the AP 200 is connected to the Internet. The way of checking whether the AP 200 is connected to the Internet is the same as that of S120.

In S134, the app 38 determines whether the check result of S120 is connectable and the check result of S130 is not-connectable. That is, the app 38 determines whether the AP 300 is connectable to the Internet and the AP 200 is not connectable to the Internet. In a case where the AP 300 is connectable to the Internet and the AP 200 is not connectable to the Internet (case J in FIG. 8), the app 38 determines YES in S134 and proceeds to S136. On the other hand, in a case where at least the AP 300 is not connectable to the Internet (case K in FIG. 9) or in a case where both of the AP 200 and the AP 300 are connectable to the Internet (case I in FIG. 7), the app 38 determines NO in S134 and ends the process of FIG. 12. In this case, the AP connection between the mobile terminal 10 and the AP 200 is maintained.

S136 is the same as S122, except that the AP disconnection instruction is for requesting disconnection of the AP connection with the AP 200. Due to this, the AP connection between the mobile terminal 10 and the AP 200 is disconnected, as a result of which the status of the SSID "ap200" in the connection table 42 is updated to "Not Connected" from "Connected". S138 is the same as S124, except that the AP connection instruction is for requesting establishment of an AP connection with the AP 300. Due to this, an AP connection is established between the mobile terminal 10 and the AP 300, as a result of which the status of the SSID "ap300" in the connection table 42 is updated to "Connected" from "Not Connected". When S138 ends, the app 38 ends the process of FIG. 12.

Effects of Present Embodiment

The processing load of the mobile terminal 10 is high in a situation where both of the AP connection with the AP 200 and the WFD connection with the printer 100 without involving the AP 200 are established. This is because a communication of a signal for maintaining the AP connection and a communication of the signal for maintaining the WFD connection are executed. So, according to the present embodiment, in the case of receiving the NFC signal from the printer 100 in the situation where the WFD connection is being established with the printer 100 (S12 in FIG. 10), the mobile terminal 10 determines whether a wireless communication via the AP 200 is executable with the printer 100 (S52 in FIG. 11). Then, in the case of determining that a wireless communication is executable with the printer 100 via the AP 200 due to the AP connection being established with the AP 200 (YES in S52), the mobile terminal 10 instructs to disconnect the WFD connection. Due to this, the mobile terminal 10 can change the status where both of the AP connection with the AP 200 and the WFD connection with the printer 100 without involving the AP 200 are established to the status where the WFD connection is not established and the AP connection is established. Therefore, the processing load of the mobile terminal 10 can be reduced.

Correspondence Relationships

The mobile terminal 10, the printer 100, the Wi-Fi I/F 20, and the NFC I/F 22 are examples of "communication device", "external device", "first wireless interface", and "second wireless interface", respectively. The access point 200 and the access point 300 are examples of "first access point" and "second access point", respectively. The NDEF signal is an example of "predetermined signal". The SSID of the access point 200 included in the NDEF signal is an example of "establishment information". The WFD connection between the mobile terminal 10 and the printer 200, the AP connection between the mobile terminal 10 and the AP 200, and the AP connection between the mobile terminal 10 and the AP 300 are examples of "specific wireless connection", "first wireless connection", and "second wireless connection", respectively.

The WFD disconnection instruction of S54 in FIG. 11, the WFD disconnection instruction of S98 in FIG. 11, the AP disconnection instruction of S122 in FIG. 12, and the AP disconnection instruction of S136 in FIG. 12 are examples of "first disconnection instruction", "second disconnection instruction", "third disconnection instruction", and "fourth disconnection instruction", respectively. The AP connection instruction of S64 in FIG. 11 and the AP connection instruction of S124 in FIG. 12, and the AP connection instruction of S138 in FIG. 12 are examples of "establishment instruction" and "re-establishment instruction", respectively.

S12 in FIG. 10 is an example of process executed by "receive a predetermined signal". S52 in FIG. 11 is an example of process executed by "determine whether a wireless communication via the first access point is executable with the external device". S54 in FIG. 11 is an example of process executed by "supply a first disconnection instruction". S58 in FIG. 11 is an example of process executed by "execute the wireless communication via the first access point with the external device". S80 in FIG. 11 is an example of process executed by "execute a wireless communication not via the first access point with the external device".

S94 and S98 in FIG. 11 are examples of processes executed by "determine whether the first wireless connection has been established" and "supply a second disconnection instruction", respectively. S96 in FIG. 11 is an example of process executed by "determine whether a wireless communication using the specific wireless connection is being executed with the external device". S64 in FIGS. 11 and S124 in FIG. 12 are examples of process executed by "supply an establishment instruction". S66 in FIG. 11 is an example of process executed by "determine whether the first wireless connection has been established in response to the establishment instruction being supplied to the first wireless interface". S122 in FIG. 12 is an example of process executed by "supply a third disconnection instruction". S134 in FIG. 12 is an example of process executed by "determine whether the second access point is being connected to the Internet" and "determine whether the first access point is being connected to the Internet". S136 and S138 in FIG. 12 are examples of processes executed by "supply a fourth disconnection instruction" and "supply re-establishment instruction", respectively.

(Variant 1) "Communication device" is not limited to the mobile terminal 10, and may be a printer, a scanner, an MFP, a stationary PC, a server, and the like.

(Variant 2) "Second wireless interface" may not be an I/F for executing an NFC communication, and may be an I/F for executing a wireless communication according to other communication scheme, such as BlueTooth (registered trademark), infrared, TransferJet, and the like.

(Variation 3) The app 38 may not resend the PING signal in the case where the PING response is not received (NO in S52 of FIG. 11) and the connection table 42 does not store AP information of an AP with which the printer 100 establishes an AP connection (NO in S60). That is, S90 to S100 may be omitted. In the present variant, "determine whether the first wireless connection has been established", "supply a second disconnection instruction", and "determine whether a wireless communication using the specific wireless connection is being executed with the external device" may be omitted.

(Variant 4) In the case of determining YES in S94 of FIG. 11, the app 38 may supply the WFD disconnection instruction to the OS 36 regardless whether a wireless communication using the WFD connection with the printer 100 is being executed or not. That is, S96 may be omitted. In the present variant, "determine whether a wireless communication using the specific wireless connection is being executed with the external device" may be omitted.

(Variant 5) In the case of not receiving the PING response (NO in S52 of FIG. 11), the app 38 may not supply, to the OS 36, the AP connection instruction for requesting establishment of an AP connection with an AP with which the printer 100 establishes the AP connection. That is, S60 to S70 may be omitted. In the present variant, "supply an establishment instruction" and "determine whether the first wireless connection has been established in response to the establishment instruction being supplied to the first wireless interface" may be omitted.

(Variant 6) In the case where the SSID "ap200" is associated with the status "Not Connected" (YES in S60 of FIG. 11), the app 38 may supply the AP connection instruction to the OS 36 after having supplied the WFD disconnection instruction to the OS 36. That is, S54 may be executed before S64.

(Variant 7) After having determined that the SSID "ap200" is associated with the status "Not Connected" (YES in S60 of FIG. 11) and having supplied the AP connection instruction to the OS 36 (S64), the app 38 may supply the WFD disconnection instruction to the OS 36 without determining whether the AP connection with the AP 200 has been established. That is, S66 may be omitted. In the present variant, "determine whether the first wireless connection has been established in response to the establishment instruction being supplied to the first wireless interface" may be omitted.

(Variant 8) The app 38 may maintain the AP connection with the AP 200 after the wireless communication of S130 in FIG. 12 has been completed, regardless whether the AP 300 is being connected to the Internet or not. That is, S120 and S132 to S138 in FIG. 12 may be omitted. In the present variant, "determine whether the second access point is being connected to the Internet", "supply a fourth disconnection instruction", "supply re-establishment instruction", and "determine whether the first access point is being connected to the Internet" may be omitted.

(Variant 9) In the AP connection process of FIG. 12, the app 38 may execute the processes of S132 and S134, after the AP connection has been established with the AP 200 (after S124) and before the processes of S126 to S130 are executed. In this case, in the case of determining NO in S134, the app 38 executes processes same as S126 to S130, whereas in the case of determining YES in S134, the app 38 executes processes same as S136, S138 and thereafter executes the wireless communication with the printer 100 by using the WFD connection.

(Variant 10) The status in the connection table 42 may include "Saved" which indicates an AP connection is currently not being established and an AP connection waits to be established. Even when the SSID "ap200" in the connection table 42 is associated with the status "Saved" in the initial states of the cases I to K, processes same as those of the cases I to K in FIGS. 7 to 9 are realized.

What is claimed is:

1. A non-transitory computer-readable recording medium storing computer-readable instructions for a communication device, wherein the computer-readable instructions, when executed by a processor of the communication device, cause the communication device to:

receive a predetermined signal from an external device in a situation where a specific wireless connection not via an access point is being established between a first wireless interface of the communication device and the external device, the predetermined signal including establishment information indicating that a wireless connection between the external device and a first access point is being established;

determine whether a wireless communication via the first access point is executable with the external device in a case where the predetermined signal including the establishment information is received from the external device;

supply a first disconnection instruction that instructs disconnection of the specific wireless connection to the first wireless interface in a case where it is determined that the wireless communication via the first access point is executable with the external device due to a first wireless connection being currently established between the first wireless interface and the first access point, wherein the first disconnection instruction is not supplied to the first wireless interface in a case where it is determined that the wireless communication via the first access point is not executable with the external device;

execute the wireless communication via the first access point with the external device using the first wireless connection in the case where it is determined that the wireless communication via the first access point is executable with the external device due to the first wireless connection being currently established; and execute a wireless communication not via the first access point with the external device using the specific wireless connection in the case where it is determined that the wireless communication via the first access point is not executable with the external device.

2. The non-transitory computer-readable recording medium as in claim 1, wherein in the situation where the specific wireless connection is being established between the first wireless interface and the external device, the predetermined signal including the establishment information is received from the external device via a second wireless interface of the communication device, the second wireless interface being different from the first wireless interface, and a maximum distance with which a wireless communication is executable via the second wireless interface is shorter than a maximum distance with which a wireless communication is executable via the first wireless interface.

3. The non-transitory computer-readable recording medium as in claim 1, wherein the computer-readable instructions, when executed by the processor, further cause the communication device to:

in the case where it is determined that the wireless communication via the first access point is not executable with the external device, after a predetermined time has elapsed from the determination, determine whether the first wireless connection has been established; and supply a second disconnection instruction that instructs disconnection of the specific wireless connection to the first wireless interface in a case where it is determined that the first wireless connection has been established, wherein the second disconnection instruction is not supplied to the first wireless interface in a case where it is determined that the first wireless connection has not been established.

4. The non-transitory computer-readable recording medium as in claim 3, wherein the computer-readable instructions, when executed by the processor, further cause the communication device to:

determine whether a wireless communication using the specific wireless connection is being executed with the external device, wherein the second disconnection instruction is supplied to the first wireless interface in a case where it is determined that the first wireless connection has been established and it is determined that the wireless communication using the specific wireless connection is not being executed with the external device, and the second disconnection instruction is not supplied to the first wireless interface in a case where it is determined that the wireless communication using the specific wireless connection is being executed with the external device.

5. The non-transitory computer-readable recording medium as in claim 1, wherein the computer-readable instructions, when executed by the processor, further cause the communication device to:

supply an establishment instruction that instructs establishment of the first wireless connection to the first wireless interface in a case where it is determined that the wireless communication via the first access point is executable with the external device due to the first wireless connection being not established and wireless setting information for establishing the first wireless connection being stored in a memory of the communication device, wherein the establishment instruction is not supplied to the first wireless interface in a case where it is determined that the wireless communication via the first access point is not executable with the external device due to the first wireless connection being not established and the wireless setting information being not stored in the memory, and the establishment instruction is not supplied to the first wireless interface in a case where it is determined that the wireless communication via the first access point is executable with the external device due to the first wireless connection being currently established, wherein the first disconnection instruction is supplied to the first wireless interface in the case where it is determined that the wireless communication via the first access point is executable with the external device due to the first wireless connection being not established and the wireless setting information being stored in the memory, and the wireless communication via the first access point is executed with the external device using the first wireless connection in the case where it is determined that the wireless communication via the first access point is executable with the external device due to the first wireless connection being not established and the wireless setting information being stored in the memory.

6. The non-transitory computer-readable recording medium as in claim 5, wherein the first disconnection instruction is supplied to the first wireless interface after the establishment instruction has been supplied to the first wireless interface in the case where it is determined that the wireless communication via the first access point is executable with the external device due to the first wireless connection being not established and the wireless setting information being stored in the memory.

7. The non-transitory computer-readable recording medium as in claim 6, wherein the computer-readable instructions, when executed by the processor, further cause the communication device to:

determine whether the first wireless connection has been established in response to the establishment instruction being supplied to the first wireless interface, the first disconnection instruction is supplied to the first wireless interface in a case where it is determined that the first wireless connection has been established in response to the establishment instruction being supplied to the first wireless interface, and the first disconnection instruction is not supplied to the first wireless interface in a case where it is determined that the first wireless connection has not been established in response to the establishment instruction being supplied to the first wireless interface.

8. The non-transitory computer-readable recording medium as in claim 5, wherein the predetermined signal including the establishment information is received from the external device in a situation where the specific wireless connection is being established and a second wireless connection is being established between the first wireless interface and a second access point different from the first access point, the computer-readable instructions, when executed by the processor, further cause the communication device to:

supply a third disconnection instruction that instructs disconnection of the second wireless connection to the first wireless interface in the case where it is determined that the wireless communication via the first access point is executable with the external device due to the first wireless connection being not established and the wireless setting information being stored in the memory, and the establishment instruction is supplied to the first wireless interface after the third disconnection instruction has been supplied to the first wireless interface in the case where it is determined that the wireless communication via the first access point is executable with the external device due to the first wireless connection being not established and the wireless setting information being stored in the memory.

9. The non-transitory computer-readable recording medium as in claim 8, wherein the computer-readable instructions, when executed by the processor, further cause the communication device to:

determine whether the second access point is being connected to the Internet, in a case where it is determined that the second access point is being connected to the Internet, supply a fourth disconnection instruction that instructs disconnection of the first wireless connection to the first wireless interface after a communication of target data with the external device has been completed via the first access point using the first wireless connection which has been established in response to the establishment instruction being supplied to the first wireless interface, wherein in a case where it is determined that the second access point is not being connected to the Internet, the fourth disconnection instruction is not supplied to the first wireless interface, and supply re-establishment instruction that instructs re-establishment of the second wireless connection to the first wireless interface after the fourth disconnection instruction has been supplied to the first wireless interface.

10. The non-transitory computer-readable recording medium as in claim 9, wherein the computer-readable instructions, when executed by the processor, further cause the communication device to:

determine whether the first access point is being connected to the Internet, in a case where it is determined that the first access point is not being connected to the Internet and the second access point is being connected to the Internet, the fourth disconnection instruction is supplied to the first wireless interface after the communication of the target data with the external device has been completed, in a case where it is determined that the first access point is not being connected to the Internet and the second access point is not being connected to the Internet, the fourth disconnection instruction is not supplied to the first wireless interface, and in a case where it is determined that the first access point is being connected to the Internet, the fourth disconnection instruction is not supplied to the first wireless interface.

11. A communication device comprising:

a first wireless interface;

a processor; and a memory storing computer-readable instructions therein, the computer-readable instructions, when executed by the processor, causing the communication device to:

receive a predetermined signal from an external device in a situation where a specific wireless connection not via an access point is being established between the first wireless interface and the external device, the predetermined signal including establishment information indicating that a wireless connection between the external device and a first access point is being established;

determine whether a wireless communication via the first access point is executable with the external device in a case where the predetermined signal including the establishment information is received from the external device;

supply a first disconnection instruction that instructs disconnection of the specific wireless connection to the first wireless interface in a case where it is determined that the wireless communication via the first access point is executable with the external device due to a first wireless connection being currently established between the first wireless interface and the first access point, wherein the first disconnection instruction is not supplied to the first wireless interface in a case where it is determined that the wireless communication via the first access point is not executable with the external device;

execute the wireless communication via the first access point with the external device using the first wireless connection in the case where it is determined that the wireless communication via the first access point is executable with the external device due to the first wireless connection having been currently established; and execute a wireless communication not via the first access point with the external device using the specific wireless connection in the case where it is determined that the wireless communication via the first access point is not executable with the external device.

12. A method executed by a communication device, the method comprising:

receiving a predetermined signal from an external device in a situation where a specific wireless connection not via an access point is being established between a first wireless interface of the communication device and the external device, the predetermined signal including establishment information indicating that a wireless connection between the external device and a first access point is being established;

determining whether a wireless communication via the first access point is executable with the external device in a case where the predetermined signal including the establishment information is received from the external device;

supplying a first disconnection instruction that instructs disconnection of the specific wireless connection to the first wireless interface in a case where it is determined that the wireless communication via the first access point is executable with the external device due to a first wireless connection being currently established between the first wireless interface and the first access point, wherein the first disconnection instruction is not supplied to the first wireless interface in a case where it is determined that the wireless communication via the first access point is not executable with the external device;

executing the wireless communication via the first access point with the external device using the first wireless connection in the case where it is determined that the wireless communication via the first access point is executable with the external device due to the first wireless connection being currently established; and executing a wireless communication not via the first access point with the external device using the specific wireless connection in the case where it is determined that the wireless communication via the first access point is not executable with the external device.

\* \* \* \* \*